(12) United States Patent
Gibb et al.

(10) Patent No.: US 7,428,564 B2
(45) Date of Patent: Sep. 23, 2008

(54) PIPELINED FFT PROCESSOR WITH MEMORY ADDRESS INTERLEAVING

(76) Inventors: Sean G. Gibb, 146 Tuscany Ravine Bay NW., Calgary, Alberta (CA) T3L 2S9; Peter J. W. Graumann, 124-72nd Avenue NE., Calgary, Alberta (CA) T2K 0N7

( * ) Notice: Subject to any disclaimer, the term of this patent is extended or adjusted under 35 U.S.C. 154(b) by 795 days.

(21) Appl. No.: 10/844,316

(22) Filed: May 13, 2004

(65) Prior Publication Data
US 2005/0114420 A1 May 26, 2005

Related U.S. Application Data

(60) Provisional application No. 60/524,879, filed on Nov. 26, 2003.

(51) Int. Cl.
*G06F 15/00* (2006.01)
(52) U.S. Cl. .................................. 708/409; 708/404
(58) Field of Classification Search .................. 708/409
See application file for complete search history.

(56) References Cited

U.S. PATENT DOCUMENTS

| | | | |
|---|---|---|---|
| 4,868,776 A | 9/1989 | Gray et al. | |
| 5,028,877 A | 7/1991 | Muller et al. | |
| 5,091,875 A | 2/1992 | Wong et al. | |
| 5,313,413 A * | 5/1994 | Bhatia et al. | 708/408 |
| 5,371,696 A | 12/1994 | Sundararajan et al. | |
| 5,694,347 A | 12/1997 | Ireland | |
| 5,717,620 A | 2/1998 | Williams | |
| 5,831,881 A * | 11/1998 | Fiedrich et al. | 708/402 |
| 5,831,883 A | 11/1998 | Suter et al. | |
| 5,835,392 A * | 11/1998 | Dulong et al. | 708/404 |
| 5,890,098 A | 3/1999 | Kozaki et al. | |
| 6,081,821 A * | 6/2000 | Hopkinson et al. | 708/406 |
| 6,240,062 B1 | 5/2001 | Kozaki et al. | |
| 6,324,561 B1 | 11/2001 | Cambonie | |
| 6,408,319 B1 | 6/2002 | Cambonie | |
| 6,421,696 B1 * | 7/2002 | Horton | 708/404 |
| 6,438,568 B1 * | 8/2002 | Bekooij et al. | 708/409 |
| 6,751,643 B2 * | 6/2004 | Jaber | 708/409 |
| 2002/0083107 A1 | 6/2002 | Park et al. | |
| 2002/0178194 A1 | 11/2002 | Aizenberg et al. | |
| 2003/0088821 A1 | 5/2003 | Yokokawa et al. | |
| 2003/0154343 A1 | 8/2003 | Yokokawa | |
| 2003/0222886 A1 | 12/2003 | Wilson | |

* cited by examiner

*Primary Examiner*—Tan V. Mai
(74) *Attorney, Agent, or Firm*—Procopio, Cory, Hargreaves & Savitch LLP

(57) ABSTRACT

A fast Fourier transform processor using a single delay path and a permuter provides a reduction in the implementation area and a related reduction in power consumption through efficiencies obtained by the modification of a butterfly unit and the use of a novel interleaver. The modified butterfly unit is obtained by the removal of complex variable multipliers, which is possible due to the simplification of twiddle factors in the stages that correspond to the modified butterfly unit.

25 Claims, 16 Drawing Sheets

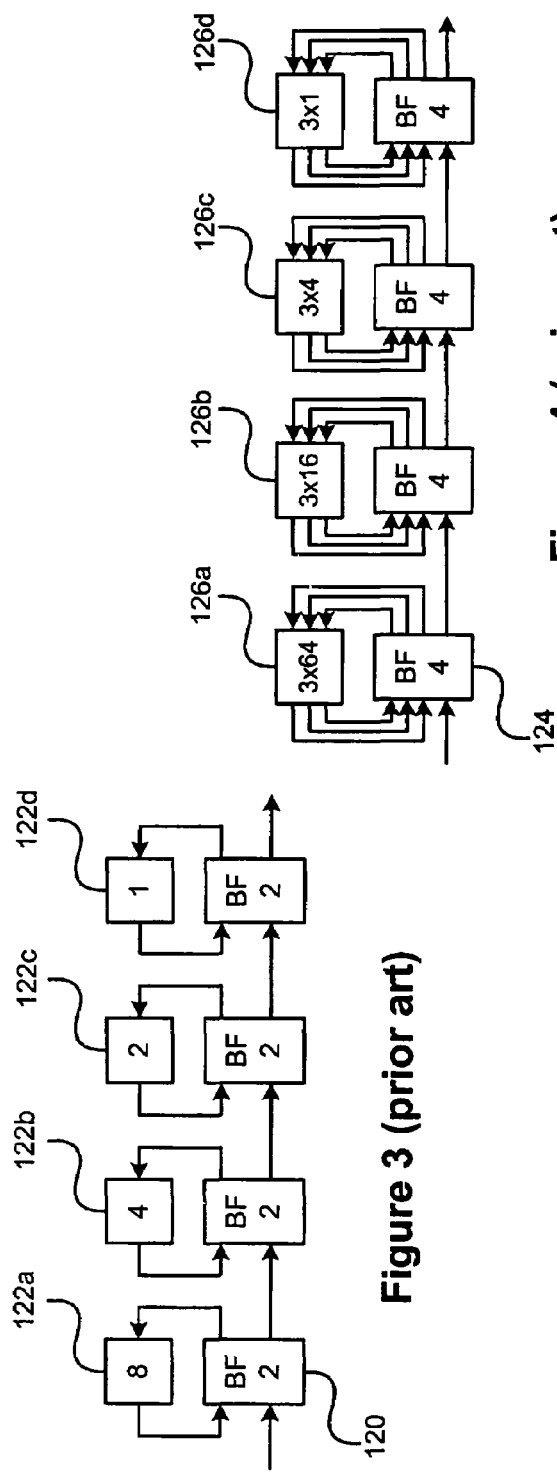
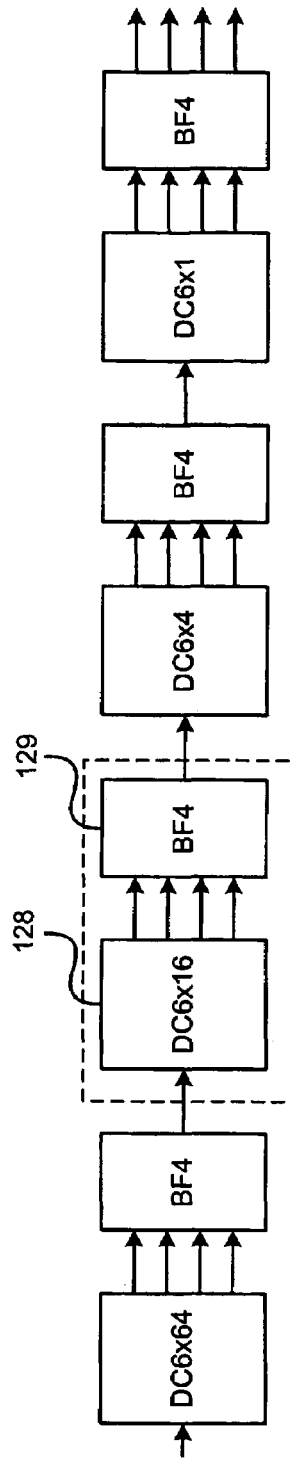
Figure 3 (prior art)
Figure 4 (prior art)
Figure 5 (prior art)

PIPELINED FFT PROCESSOR WITH MEMORY ADDRESS INTERLEAVING

CROSS REFERENCE TO RELATED APPLICATIONS

This application claims the benefit of U.S. Provisional Application No. 60/524,879, filed Nov. 26, 2003, the entirety of which is incorporated herein by reference.

FIELD OF THE INVENTION

The present invention generally relates to fast Fourier transform (FFT) processors. More particularly, the present invention relates to pipelined FFT processors with modified butterfly units.

BACKGROUND OF THE INVENTION

The discrete Fourier transform (DFT) implementation of the FFT is an important block in many digital signal processing applications, including those which perform spectral analysis or correlation analysis. The purpose of the DFT is to compute the sequence $\{X(k)\}$, having N complex-valued numbers, given another sequence $\{x(n)\}$ also of length N, where $\{X(k)\}$ is expressed by the formula:

$$X(k) = \sum_{n=0}^{N-1} x(n) W_N^{kn}$$

where $$W_N = e^{\frac{-j2\pi}{N}}$$

It can be observed from these formulae that for each value of k, a direct computation of X(k) involves N complex multiplications and N−1 complex additions. Thus, to compute the DFT, X(k) must be computed for N values of k, which would require $N^2$ complex multiplications and $N^2-N$ complex additions.

This general form solution can be decomposed using a divide-and-conquer approach, where the most commonly used decimating factors are 2 or 4 (leading to the "radix-2" or "radix-4" FFT implementations of the DFT). An example of a discussion of this implementation may be found in *Digital Signal Processing: Principles, Algorithms and Applications*, by J. G. Proakis and D. G. Manolakis, Prentice-Hall Publishing Inc., 1996.

In such a divide-and-conquer approach, the computation of the DFT is performed by decomposing the DFT into a sequence of nested DFTs of progressively shorter lengths. This nesting and decomposition is repeated until the DFT has been reduced to its radix. At the radix level, a butterfly operation can be performed to determine a partial result which is provided to the other decompositions. Twiddle factors, which are used to perform complex rotations during the DFT calculation, are generated as the divide-and-conquer algorithm proceeds. For a radix-2 decomposition, a length-2 DFT is performed on the input data sequence $\{x(n)\}$. The results of the first stage of length-2 DFTs are combined using a length-2 DFT and then the resulting value is rotated using the appropriate twiddle factors. This process continues until all N values have been processed and the final output sequence $\{X(k)\}$ is generated. FFT processors performing the above process are commonly implemented as dedicated processors in an integrated circuit.

Many previous approaches have improved the throughput of FFT processors while balancing latency against the area requirements through the use of a pipeline processor-based architecture. In a pipeline processor architecture, the primary concern from the designer's perspective is increasing throughput and decreasing latency while attempting to also minimize the area requirements of the processor architecture when the design is implemented in a manufactured integrated circuit.

A common pipeline FFT architecture achieves these aims by implementing one length-2 DFT (also called a radix-2 butterfly) for each stage in the DFT recombination calculation. It is also possible to implement less than or more than one butterfly per recombination stage. However, in a real-time digital system, it is sufficient to match the computing speed of the FFT processor with the input data rate. Thus, if the data acquisition rate is one sample per computation cycle, it is sufficient to have a single butterfly per recombination stage.

A brief review of pipeline FFT architectures in the prior art is provided below, in order to place the FFT processor of this invention into perspective.

In this discussion, designs implementing the radix-2, radix-4 and more complex systems are described. Input and output order is assumed to be the most appropriate form for the particular design. If a different order is required, an appropriate re-ordering buffer (consisting of both on-chip memory and control circuits) can be provided at the input or output of the pipeline FFT, which is noted as a "cost" of implementation as that adds complexity or uses additional area on chip.

FFT implementations that accept in-order input data are most suitable for systems where data is arriving at the FFT one sample at a time. This includes systems such as wired and wireless data transmissions systems. Out-of-order input handling is most appropriate when the input data is buffered and can be pulled from the buffer in any order, such as in an image analysis system.

All of the discussed architectures are based on the Decimation-in-Frequency (DIF) decomposition of the DFT. Input and output data is complex valued as are all arithmetic operations.

For the radix-2 designs, a constraint that N is a power of 2 applies, and for the radix-4 designs, a constraint that N is a power of 4 applies. For simplification of algorithmic analysis, all of the control and twiddle factor hardware has been omitted. Because the control hardware plays a minor role in the overall size of the FFT this is acceptable for a coarse comparison of the architectures.

FIG. 1 illustrates a conventional Radix-2 Multi-path Delay Commutator ("R2MDC") pipeline FFT processor. The R2MDC approach breaks the input sequence into two parallel data streams. In each butterfly module, one of which is labelled 100, a commutator 102 receives the data stream as input and delays half of the data stream with memory 104. The delayed data is then processed with the second half of the data stream in a radix-2 butterfly unit 106. Part of the output of the butterfly unit 106 is delayed by buffering memory 108 prior to being sent to the next butterfly module. In each subsequent butterfly module the size of both memory 104 and 108 are halved. The processor of FIG. 1 implements a 16-point R2MDC pipeline FFT. In terms of efficiency of design, the multipliers and adders in the R2MDC architecture are 50% utilized. The R2DMC architecture requires 3/2 N-2 delay registers.

A Radix-4 Multi-path Delay Commutator ("R4MDC") pipeline FFT is a radix-4 version of the R2MDC, where the input sequence is broken into four parallel data streams. In terms of efficiency of design, the R4MDC architecture's multipliers and adders are 25% utilized, and the R4MDC designs require 5/2 N-4 delay registers. An exemplary 256-point R4MDC pipeline implementation is shown in FIG. 2. The FFT processor of FIG. 2 is composed of butterfly modules, such as butterfly module 110. Butterfly module 110 includes commutator 112 with an associated memory 114, butterfly unit 116 and an associated memory 118. The commutator 112 orders samples and stores them in memory 114. When memory 114 is sufficiently full, three samples are provided from memory 114 along with one sample from commutator 112 to the radix-4 butterfly unit 116. A standard radix four butterfly operation is performed on the samples, and the results are provided to a subsequent commutator, after some of them have been buffered in memory 118. The use of memories 114 and 118 ensure in order delivery of the samples between butterfly units.

A Radix-2 Single-path Delay Feedback ("R2SDF") pipeline FFT design uses the memory registers more efficiently than the R2MDC implementation by storing the butterfly output in feedback shift registers. In terms of efficiency, R2SDF designs achieve 50% utilization of multipliers and adders and require N-1 delay registers, which are fully utilized. FIG. 3 shows the basic architecture of a prior art R2SDF for a 16-bit FFT. A butterfly module is composed of the radix-2 butterfly unit, such as butterfly unit 120, and its associated feedback memory 122. The size of the memory 122a-122d in a butterfly module varies with the position of the module in the series. Butterfly unit 120 receives an input series of 16 samples, and buffers the first 8 samples in feedback memory 122a. Starting with the ninth sample in the series, butterfly unit 120 serially pulls the stored samples from feedback memory 122a and performs butterfly operations on the pair-wise samples. The in order output is provided to the next butterfly module by storing out of order outputs in the feedback memory 122a until they can be provided in order.

A Radix-4 Single-path Delay Feedback ("R4SDF") pipeline FFT is a radix-4 version of the R2SDF design. The utilization of the multipliers increases to 75% in implementation, but the adders are only 25% utilized, while the design will require N-1 delay registers. The memory storage is fully utilized. A 256-point R4SDF pipeline example from the prior art is shown in FIG. 4. The structure of the processor of FIG. 4 is similar to that of FIG. 3, with butterfly modules being composed of a radix-4 butterfly unit, such as BF4 124, and an associated feedback memory 126. The size of feedback memory 126 decreases from 126a-126d in accordance with the amount of separation required between samples. The butterfly modules of FIG. 4 function in the same fashion as those of FIG. 3, with additional samples being stored in feedback memory 126 in each cycle.

A Radix-4 Single-path Delay Commutator ("R4SDC") uses a modified radix-4 algorithm to achieve 75% utilization of multipliers, and has a memory requirement of 2N-2. A prior art 256-point R4SDC pipeline FFT is shown in FIG. 5. FIG. 5 has single input single output butterfly modules, such as butterfly module 127. In butterfly module 127 a single input is provided to commutator 128 which stores and reorders samples using an internal memory. Commutator 128 provides the samples four at a time to radix four butterfly unit 129. The output of butterfly unit 129 is serially provided to the next butterfly module.

A Radix-$2^2$ Single-path Delay Feedback ("R2$^2$SDF") pipeline FFT design breaks one radix-4 butterfly operation into two radix-2 butterfly operations with trivial multiplications of ±1 and ±j in order to achieve 75% multiplier utilization and 50% adder utilization, with memory requirements of N-1. The architecture of an exemplary 256-point R2$^2$SDF implementation is illustrated in FIG. 6. Butterfly modules are composed of butterfly units such as BF2I 130 and an associated feedback memory such as memory 131. Butterfly unit 130 receives a series of input samples and buffers the first set of samples in memory 131, then performs pairwise butterfly operations using stored samples and the incoming series. The operation of this processor is functionally similar to that of the processor of FIG. 4 with the differences noted above.

US Patent Application Publication No. 2002/0178194A1 to Aizenberg et al. teaches the calculation of a single twiddle factor before moving onto a new twiddle factor during computation. It uses a single butterfly which uses both a true adder and an arithmetic logic unit (ALU). The advantage of the resulting circuit is a reduction in the implementation area which comes at the cost of reduced data throughput.

US Patent Application Publication No. 2002/0083107A1 to Park et al. teaches the use of a radix-4 and radix-2 butterfly units together to reduce the number of complex multiplications performed. It uses the multi-path delay commutator architecture, or single-path delay commutator architecture.

U.S. Pat. No. 6,408,319 to Cambonie teaches a memory architecture based upon the radix-4 architecture. The memory allocation in this application is based on a loopback architecture similar to the single path delay feedback (SDF) architecture. Furthermore this patent teaches the use of a single-access memory. SDF architectures, such as this one, have sub-optimal adder requirements in their implementation.

U.S. Pat. No. 5,694,347 to Ireland teaches an architecture based on a decimation in time algorithm for the FFT. The butterfly disclosed is large in comparison to other butterflies and does not offer additional throughput or a reduction in the area of other components in the system.

The prior art includes trade-offs in design implementation. Trade offs are made among implementation area, power consumption, complexity, and data throughput. Although some innovation has taken place in the area of altered algorithms, including the use of hybrid single butterfly/pipelined throughput, and novel addressing schemes the prior art FFT processors do not provide satisfactory implementation area, and power consumption without incurring high degrees of complexity and impairing throughput.

SUMMARY OF THE INVENTION

It is an object of the present invention to obviate or mitigate at least one disadvantage of previous transform processors.

In a first embodiment of the invention there is provided a single path delay fast Fourier transform (FFT) processor for performing an FFT on a series of input samples organized as pairs. The processor comprises a first butterfly unit, an interleaver and a second butterfly unit. The first butterfly unit receives the series of input samples, and performs a first butterfly operation on each received pair of samples to provide a serial output. The interleaver receives the serial output, and permutes samples in the serial output to provide a permutation as a pairwise series of samples. The second butterfly unit serially receives the pairwise series of samples from the interleaver, and performs a second butterfly operation on each pair of samples in the pairwise series to obtain an output series of samples corresponding to an FFT of the series of input samples.

In embodiments of the first aspect of the present invention, the second butterfly unit is a modified butterfly unit and includes a set of adders for receiving real and imaginary components of each sample, and for performing the second butterfly operation using the received real and imaginary components of each sample. In another embodiment, the first butterfly unit is a modified butterfly unit including a multiplexer and a set of adders. The multiplexer receives the series of input samples, swaps real and imaginary components of selected samples and provides the selectively swapped components as an output. The set of adders performs the first butterfly operation using the selectively swapped components from the multiplexer. The multiplexer is preferably controlled by a modulo counter to perform component swapping on one half of the input samples of the received series. In a further embodiment the processor includes a modified butterfly unit and a further interleaver. The modified butterfly unit receives the series of input samples, and performs a modified butterfly operation on each received pair of samples to provide a serial output. The further interleaver receives the serial output of the modified butterfly unit, permutes the samples in the serial output of the modified butterfly to provide the permuted samples as the input series to the first butterfly module. In other embodiments, the modified butterfly unit includes a multiplexer for selectively swapping real and imaginary components of the pairs of samples, a set of adders, for performing the modified butterfly operation using the selectively swapped components from the multiplexer, and a constant multiplier for selectively applying a constant twiddle factor to the result of the modified butterfly operation and for providing the selectively multiplied result to the further interleaver. In a futher embodiment, the first and second butterfly modules are both multiplierless butterfly units for performing butterfly operations on the received pairs of samples.

In another embodiment, the interleaver includes an addressable memory for receiving and storing the serial output of the first butterfly module, and an address generator for generating memory addresses at which each result from the first butterfly can be stored. The addressable memory is preferably sized to store one half of the serial output of the first butterfly module. The interleaver preferably further includes a complete compressing permuter for providing the address generator with memory addresses for the first half of the serial output of the first butterfly module. The complete compressing permuter preferably generates an address for the xth sample in accordance with the formula $$c_m(x) = \begin{cases} x, & 0 \le x\mathrm{mod}2^m < 2^{m-1} \\ 2^m \left\lfloor \frac{x}{2^m} \right\rfloor + f(x\mathrm{mod}2^{m-1}), & 2^{m-1} \le x\mathrm{mod}2^m < 2^m \end{cases},$$

where $2^m$ is the size of the addressable memory, and $$f(x) = \frac{x}{2^{\log_2(g(x+1))+1}},$$

where $g(x)$ is the bitwise-and of the sample and its sign inverse. Preferably the complete compressing permuter includes a compressing permuter for determining an address in accordance with $$2^m \left\lfloor \frac{x}{2^m} \right\rfloor + f(x\mathrm{mod}2^{m-1})$$

and a multiplexer for switching between the address determined by the compressing permuter and an address determined in accordance with the position of the sample in the serial output. The address generator preferably includes a sequence permuter for shifting the address generated by the complete compressing permuter to prevent overwriting data not provided to the second butterfly unit.

In a second aspect of the present invention, there is provided a single path delay fast Fourier transform (FFT) processor for performing an FFT on a series of input samples organized as pairs. The processor comprises a plurality of butterfly modules connected in series each having a memory for receiving a series of samples and an associated butterfly unit for performing butterfly operations on the series of samples in the memory, the first butterfly module in the plurality for receiving and storing the series of input samples in memory, the final butterfly module in the plurality for providing a butterfly operation output as a series of samples corresponding to an FFT of the series of input samples. At least one of the plurality of butterfly modules has an interleaving memory for receiving and storing a series of samples, and for permuting the samples to obtain a pairwise series of samples, and for serially providing an associated buttefly unit with the permuted pairwise series. In one embodiment, the interleaving memory serially receives the series of samples from a previous butterfly module.

The present invention provides a novel real-time pipeline FFT processor design, optimized to reduce butterfly processor area, namely the multiplier and adder units in the butterfly implementation. There is also a novel addressing scheme using permuters, or interleavers, to efficiently generate memory addresses useful to the FFT processor design.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 3 is a block diagram illustrating a radix-2 single path delay feedback pipelined FFT processor of the prior art;

FIG. 4 is a block diagram illustrating a radix-4 single path delay feedback pipelined FFT processor of the prior art;

FIG. 5 is a block diagram illustrating a radix-4 single path delay commutator pipelined FFT processor of the prior art;

DETAILED DESCRIPTION

Generally the present invention provides an FFT processor architecture using a modified butterfly unit. The modified butterfly unit can provide a reduction in the implementation area by maximizing utilization of components while removing unnecessary components. An interleaving memory architecture is further provided by the present invention to allow for a further reduction in implementation area.

The FFT processor of the present invention uses an interleaving memory structure to receive samples out of order, and to permute them so that they are provided to the butterfly unit in the required order. This reduces the memory requirement for the butterfly unit. The interleaver is preferably used to connect two butterfly units, so that it recieves out of order samples from one unit and provides in order samples to the other. The first butterfly unit receives a series of input samples organized as pairs, and performs a butterfly operation on each pair, providing the output to the interleaver. The second butterfly unit serially recieves pairs of samples from the interleaver, performs a butterfly operation on the pairs of samples, and provides as an output, a series of samples corresponding to the FFT of the series of input samples.

In another implementation, the present invention provides an FFT processor having a plurality of serially connected butterfly modules. Each butterfly module receives the output of the previous module, with the first module receiving the input series of samples. The final butterfly module provides its output as a series of samples corresponding to an FFT of the series of input samples. At least one of the butterfly modules in the plurality includes an interleaving memory which receives samples out of order, and provides them to the associated butterfly unit in the required order.

The present invention can best be understood through a cursory examination of the data flows of an FFT and understanding the implications of these data flows in processor architecture.

Figure 1:
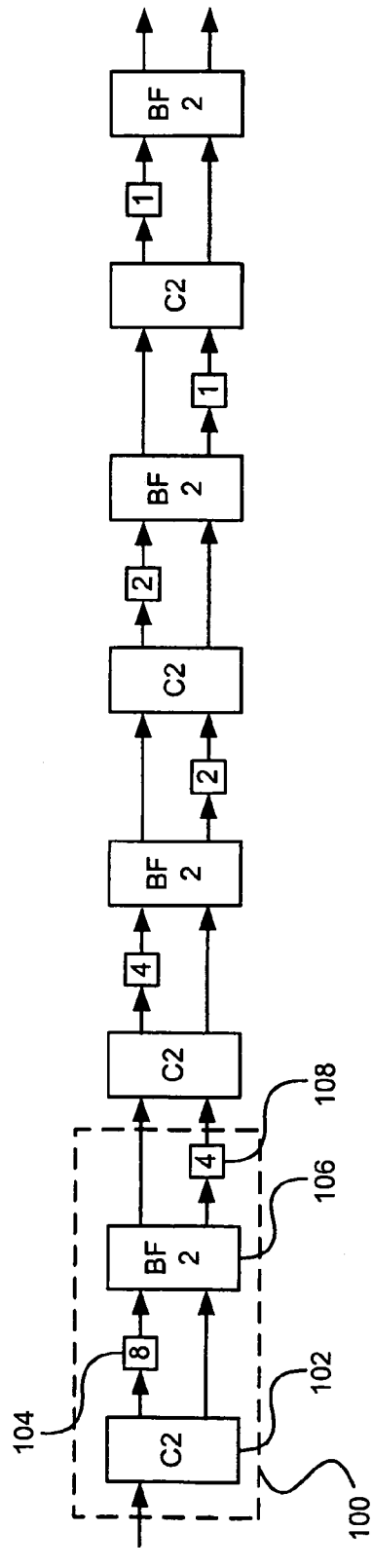
FIG. 1 is a block diagram illustrating a radix-2 multipath delay commutator pipelined FFT processor of the prior art.
Figure 2:
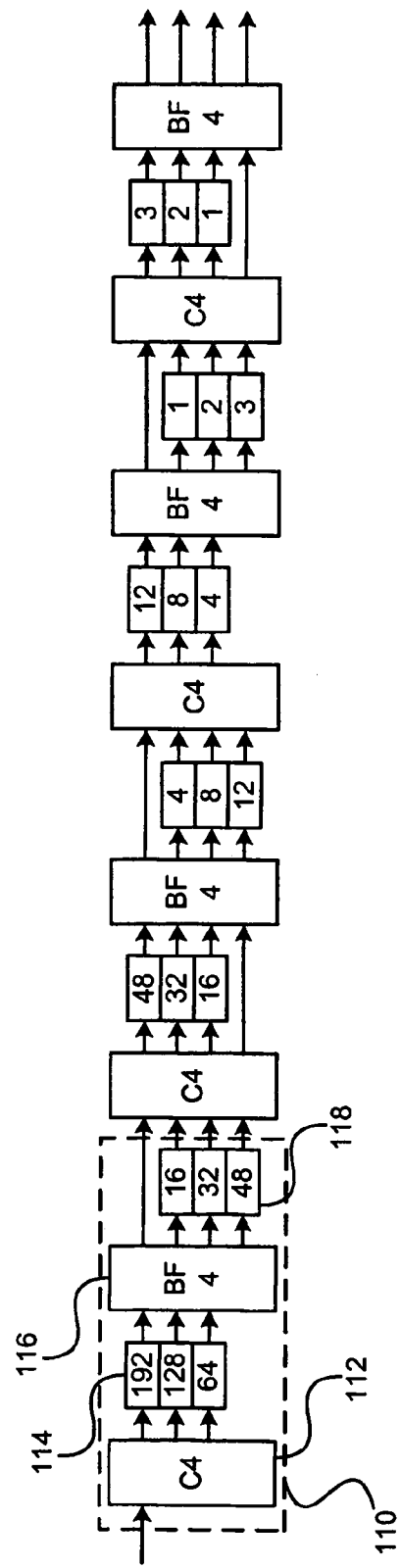
FIG. 2 is a block diagram illustrating a radix-4 multipath delay commutator pipelined FFT processor of the prior art.
Figure 6:
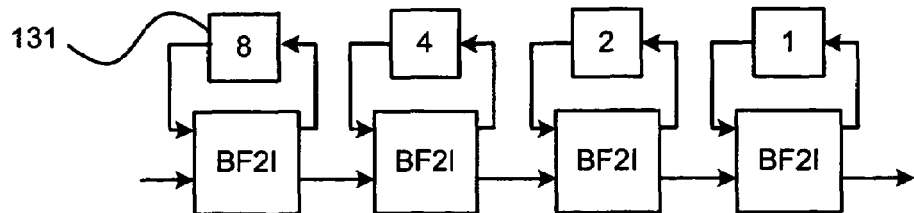
FIG. 6 is a block diagram illustrating a radix-$2^2$ single path delay feedback pipelined FFT processor of the prior art.
Figure 7:
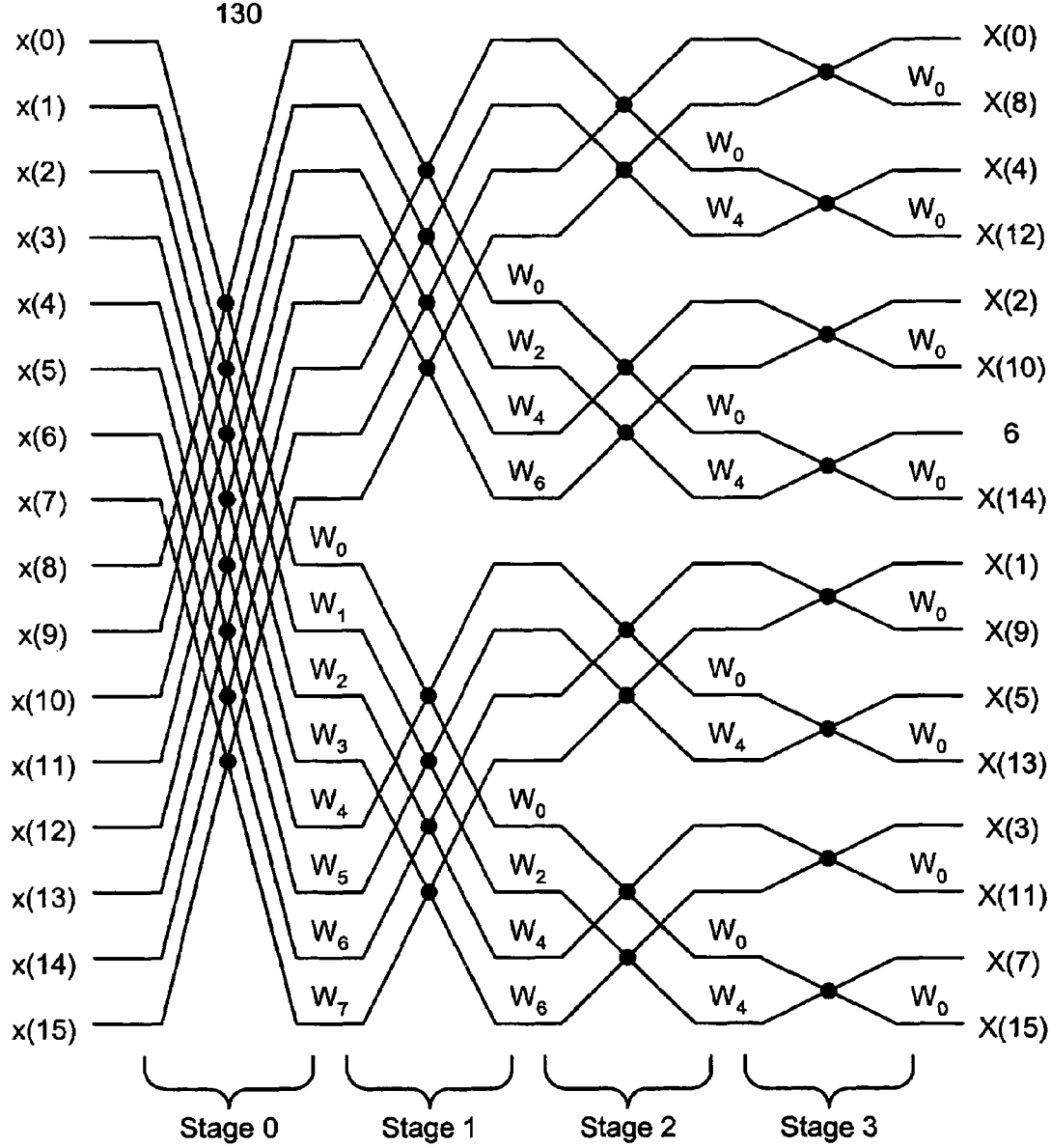
FIG. 7 is a flow graph of a decimation in frequency FFT, for N=16.

Consider the data flow of a 16-point DIF FFT structure as shown in FIG. 7. The complex twiddle factors $W_k$ are shown at the end of each stage and are specified by the formula $W_k = e^{-j2\pi k/N}$ where N=16 in a 16-point FFT. The input sequence, x(0) through x(15), passes through $\log_2 N$=4 stages. In each stage, two samples from the sequence are paired and a butterfly operation is performed. At successive stages, the input sequence is segmented to restrict the pairings of samples. At each stage, the lower half of each butterfly is multiplied by twiddle factor $W_k$. In stage 3, the final stage, only $W_0$ is applied as a twiddle factor. In stage 2, either $W_0$ or $W_4$ is applied, and in stage 1 one of $W_0$, $W_2$, $W_4$ and $W_6$ is applied.

Figure 8:
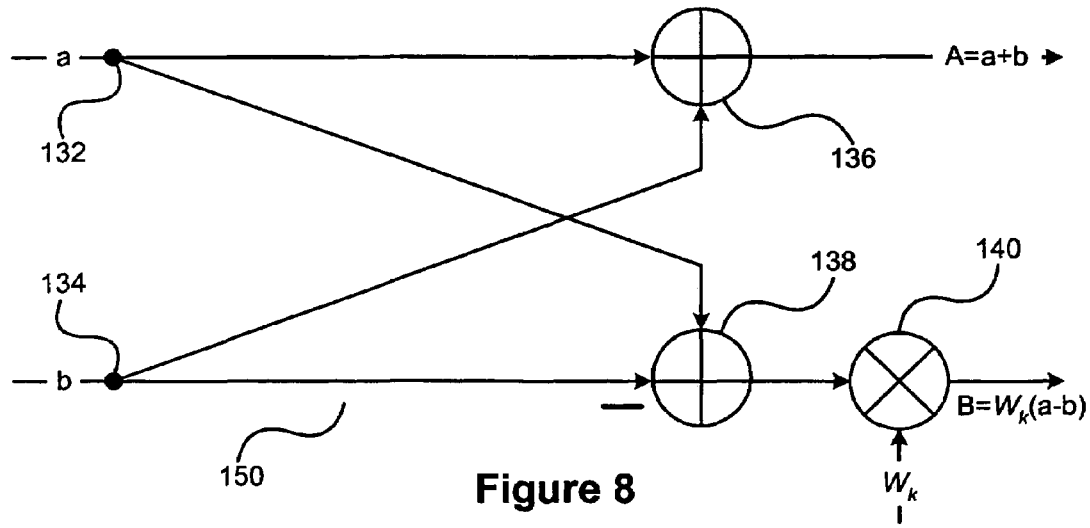
FIG. 8 illustrates a general butterfly module of the present invention.

The general form of a butterfly unit 150 in a DIF FFT is shown in FIG. 8. All of the signals in this butterfly, including the twiddle factor, are complex valued. Two complex samples, a and b, are received at inputs 132 and 134 respectively. Both values are provided to adder 136, which provides as an output A=a+b. Both input values are also provided to adder 138, after input b is sign inverted, and the output of adder 138 is provided to multiplier 140, which multiplies the output by a twiddle factor $W_k$. The output of multiplier 140 is $B=W_k(a-b)$.

The present invention provides modified butterfly units based upon optimizations related to the twiddle factor values, $W_k$. These optimizations can reduce the physical implementation of the circuit embodying this form in the last stages of the FFT.

Figure 9:
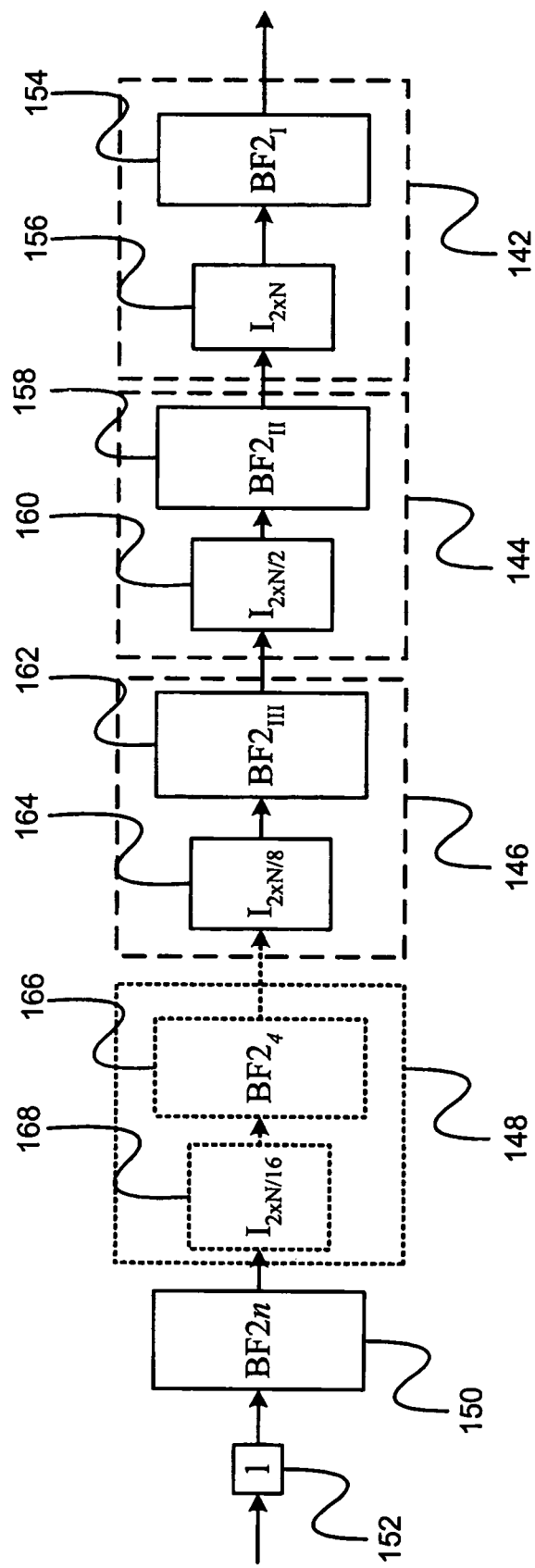
FIG. 9 is a block diagram illustrating a radix-2 single path delay permuter pipelined FFT processor of the present invention.

A functional block diagram of the implementation of a DIF FFT processor of the present invention is shown in FIG. 9. As with previous FFT processors, the FFT processor of FIG. 9 is implemented as a series of stages, each stage corresponding to a butterfly module. The final stage of the processor is provided by butterfly module 142, the penultimate stage by butterfly module 144 and the third last stage by butterfly module 146. The butterfly module 146 is optionally preceded by a plurality of butterfly modules 148, the number selected in accordance with the length of the FFT that is to be computed. The initial butterfly unit 150 is preceded by the source 152. It is assumed that the source provides the input series of samples in the order required by BF2n 150.

In the butterfly modules, 142, 144, 146 and 148, two basic units are employed: butterfly units 154, 158, 162 and 166 respectively, and interleaver memories 156,160, 164, and 168. An interleaver memory is also referred to as a permuter, as it has a single input and the interleaving of a single channel is functionally equivalent to the permutation of the channel contents. Due to the use of permuters, the architecture of FIG. 9 is referred to herein as a Radix-2 Single-path Delay Permuter ("R2SDP") design.

The system of FIG. 9 provides three modified butterfly modules 142, 144 and 146, connected in series. Each of the modified butterfly modules includes an interleaving memory for receiving the output of the previous stage and for permuting the received output into the order required for the associated modified butterfly unit. In the embodiment of FIG. 9, three modified butterfly units, $BF2_I$ 154, $BF2_{II}$ 158 and $BF2_{III}$ 162 are used to perform the final three FFT stages. These three modified butterfly modules are optionally preceded by a series of general butterfly modules 148 and a butterfly unit 150 that receives the input sequence. One skilled in the art will appreciate that preceding the modified butterfly modules by other butterfly modules allows for longer length FFTs to be computed. Interleaver memory units 156, 160, 164 and 168 are also included in the butterfly modules 141, 144, 146 and 148 respectively. The interleaver memory units are named using the nomenclature $I_{rxn}$ where r is the radix of the interleaver (in this example, 2) and n is the number of values interleaved in a single operation. Note that n may take a value between 2 in the first stage's interleaver and N in the last stage's interleaver. The actual memory requirements for the memory interleaver stage is n/2. Larger FFTs simply have additional BF2n butterflies and memory interleaver units (each requiring twice as much storage as the previous interleaver). For the purpose of this disclosure, the data acquisition rate is assumed to be one sample per cycle. It will be obvious to one skilled in the art that the invention is neither limited to one sample per cycle, nor to radix-2 implementations.

The modifications of $BF2_I$ 154, $BF2_{II}$ 158 and $BF2_{III}$ 162 are largely motivated by an analysis of the butterfly operations performed by these modules. In an R2SDP FFT processor the final stage butterfly, $BF2_I$ 154, can be implemented without a multiplier, as $$W_K = e^{-j2\pi \frac{k}{N}}$$

for k=0 devolves to $$W_0 = e^{-j2\pi \frac{0}{N}} = e^0 = 1.$$

Figure 10:
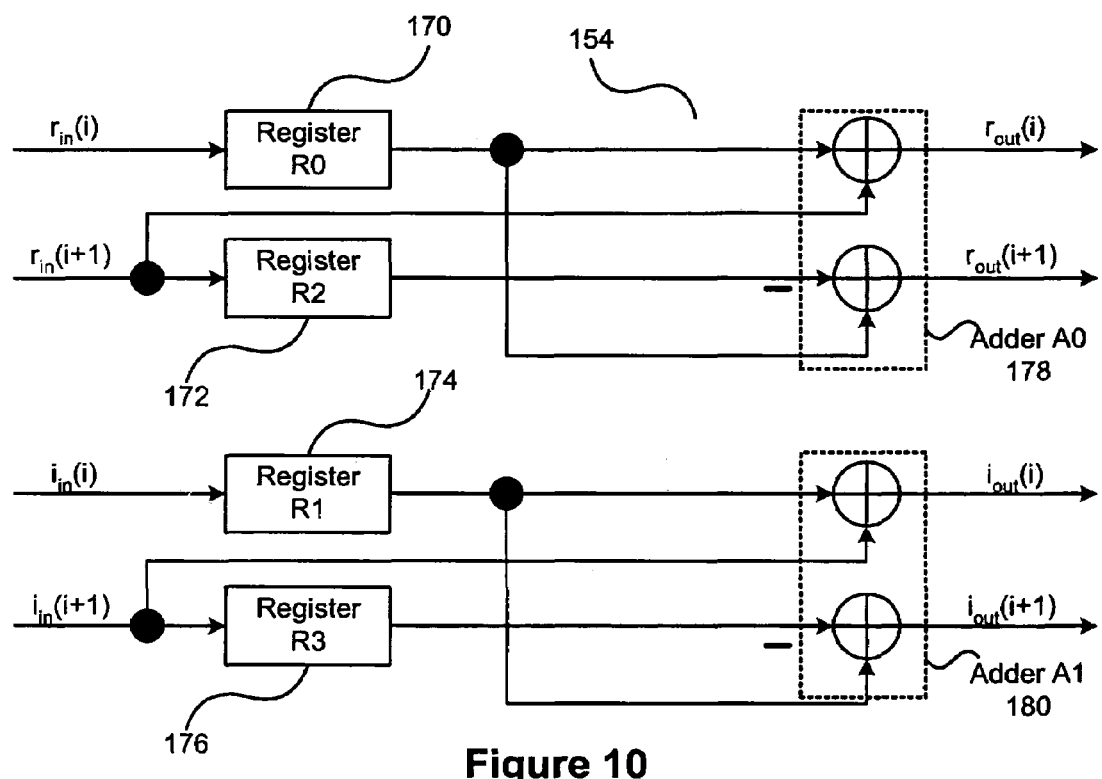
FIG. 10 illustrates a modified butterfly module of the present invention.
Figure 11:
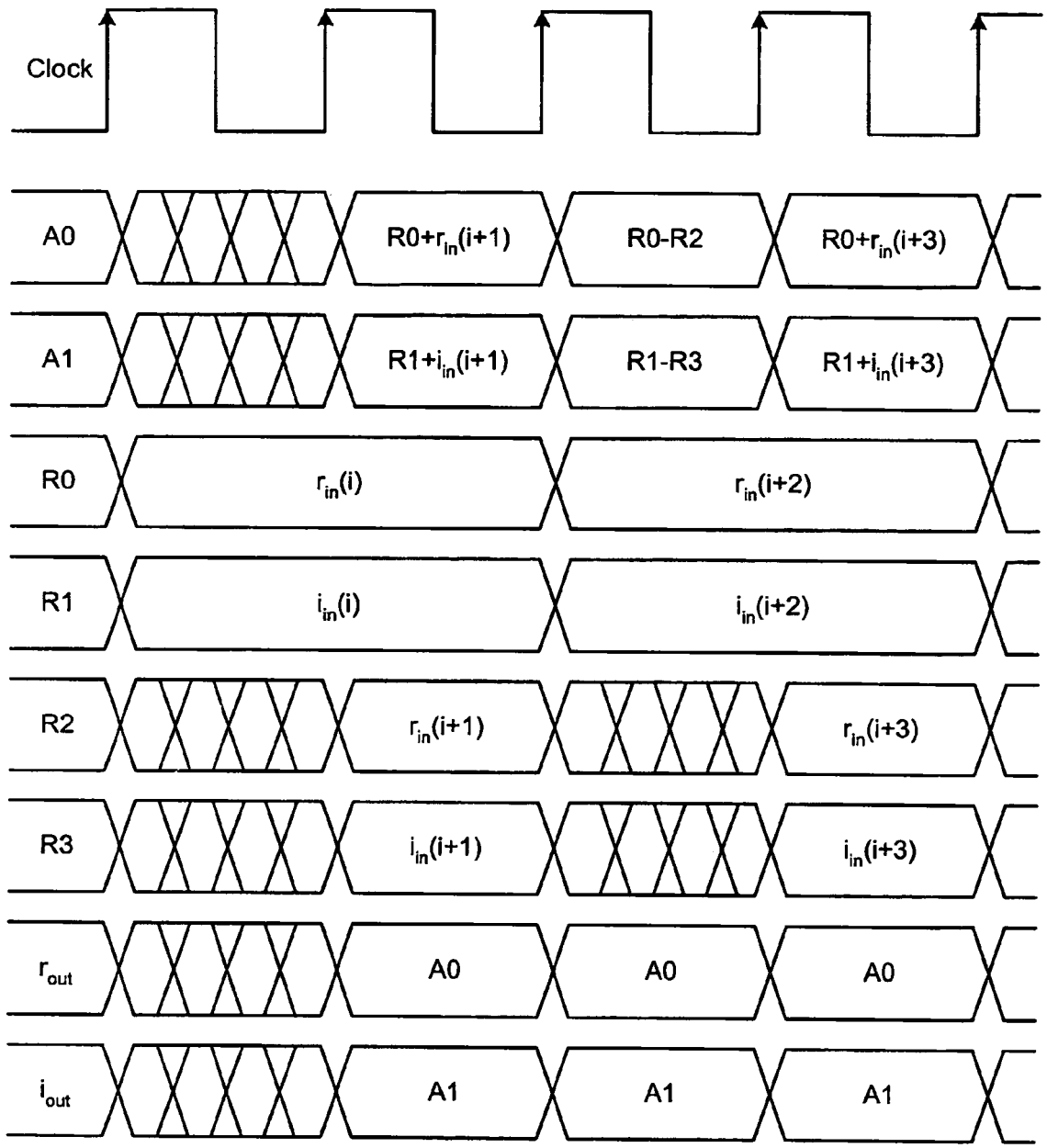
FIG. 11 is a signal diagram showing the use of each of the hardware components in the modified butterfly of FIG. 10.

The complex inputs are of the form $r_{in}(k)+ji_{in}(k)$, where the sample k is in the interval $0 \leq k < N$, and are provided to the butterfly unit serially at a rate of one sample per cycle. Thus, the samples $r_{in}(i)+ji_{in}(i)$ and $r_{in}(i+1)+ji_{in}(i+1)$ are separated by one clock cycle. Though these samples may be generated by a previous butterfly module with a greater distance between them, the interleaver memory 156 provides them to butterfly unit 154 in adjacent time slots. Thus, an implementation of butterfly unit 154 requires four registers (two registers per input, allowing storage of the real and imaginary components of a sample) and two adder units. An exemplary implementation of butterfly unit 154 is provided in FIG. 10. The description of FIG. 10 is best understood in combination with the signal timing diagram of FIG. 11 which is also used to illustrated the utilization of the hardware components of the embodiment of FIG. 10.

In the first clock cycle, registers R0 170 and R1 174 receive the real and imaginary components of the $i^{th}$ sample respectively. In the next clock cycle, registers R2 172 and R4 176 receive the real and imaginary components of the $i^{th}+1$ sample respectively. In the same clock cycle, adder A0 178 sums the contents of register R0 170 and the real component of the $i^{th}+1$ sample while adder A1 180 sums the contents of register R1 174 and the imaginary component of the $i^{th}+1$ sample. The adders 178 and 180, taken in combination, are used to provide the sum of the complex inputs, shown as A=a+b in FIG. 8 at the output of adder 136. In the third clock cycle adder A0 178 takes the difference between the contents of registers R0 170 and R2 172, while Adder A1 180 takes the difference between the contents of registers R1 174 and R3 176. In this clock cycle, the adders 178 and 180, are used to provide the difference between the complex inputs, shown as $B=W_k(a-b)$ in FIG. 8 as the output of adder 138 and multiplier 140, as $W_k=1$ as described above. As this is being done, all registers 170, 172, 174 and 176 are emptied, and the $i^{th}+2$ sample arrives for storage in registers R0 170 and R1 174. One skilled in the art will appreciate that because two input samples are received in 2 clock cycles the butterfly operation preferably provides the output of the butterfly operation on the two samples in 2 clock cycles to maintain timing and data flow. The adder units A0 178 and A1 180 are 100% utilized and the butterfly internal registers 170, 172, 174, and 176 are 75% utilized. Though it is possible to further pipeline the modified butterfly, it is not essential, as the unit is far removed from the critical path of the overall FFT processor illustrated in FIG. 9.

With reference to the data flow illustrated in FIG. 7, the penultimate stage in the FFT only applies $W_0$ and $W_{16/4=4}$ as twiddle factors. As shown earlier, $W_0=1$, and for k=N/4, $$W_{N/4} = e^{-j2\pi \frac{N}{4N}} = e^{-j\pi/2} = -j.$$

Thus, butterfly module 144 can also have a modified butterfly unit 158 implemented without a multiplier because $$W_k = \begin{cases} 1 & k = 0 \\ -j & k = N/4 \end{cases}.$$

Figure 12:
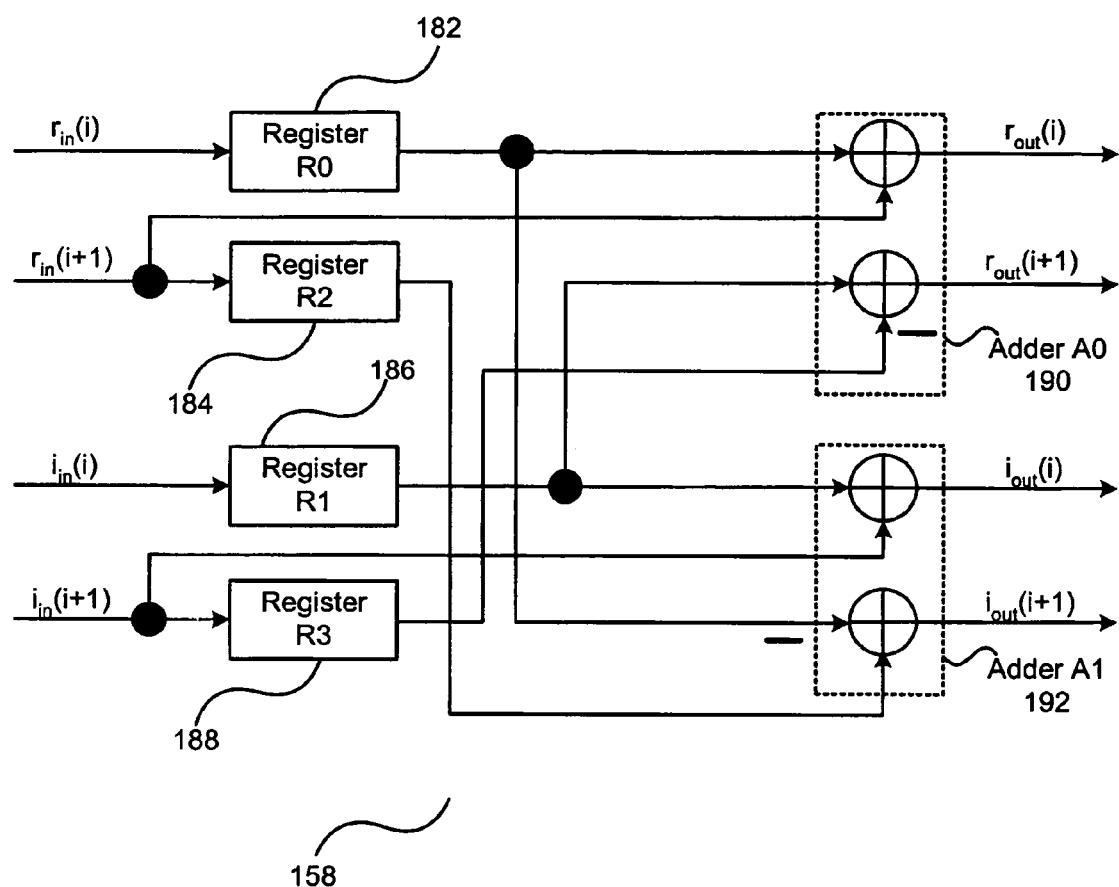
FIG. 12 illustrates a modified butterfly module of the present invention for performing sign inversion and real-imaginary component swapping.

Multiplication by $-j$ is a trivial operation that can be implemented using only real-imaginary component swapping and sign inversion. FIG. 12 illustrates an exemplary embodiment of the modified butterfly $BF2_{II}$ 158. $BF2_{II}$ 158 operates in two modes, one for each of the coefficients. In the first mode, the circuit behaves exactly as $BF2_I$ 154 does. $BF2_{II}$ 158 has the same hardware requirements and utilization as in the multiplierless radix-2 butterfly (four registers and two adder units). However, to permit the real-imaginary component swapping required, additional multiplexers are provided on the four adder inputs in order to steer signals to perform the real-imaginary swap when the coefficient $-j$ is applied. The registers and adders for the two coefficients are shared by using multiplexers between the registers and adder inputs to steer the input signals to perform the effective multiplication by 1 or $-j$. A signal diagram in FIG. 13 shows the signal characteristics of the R2SDP $BF2_{II}$ butterfly with multiplication by both coefficients.

Figure 13:
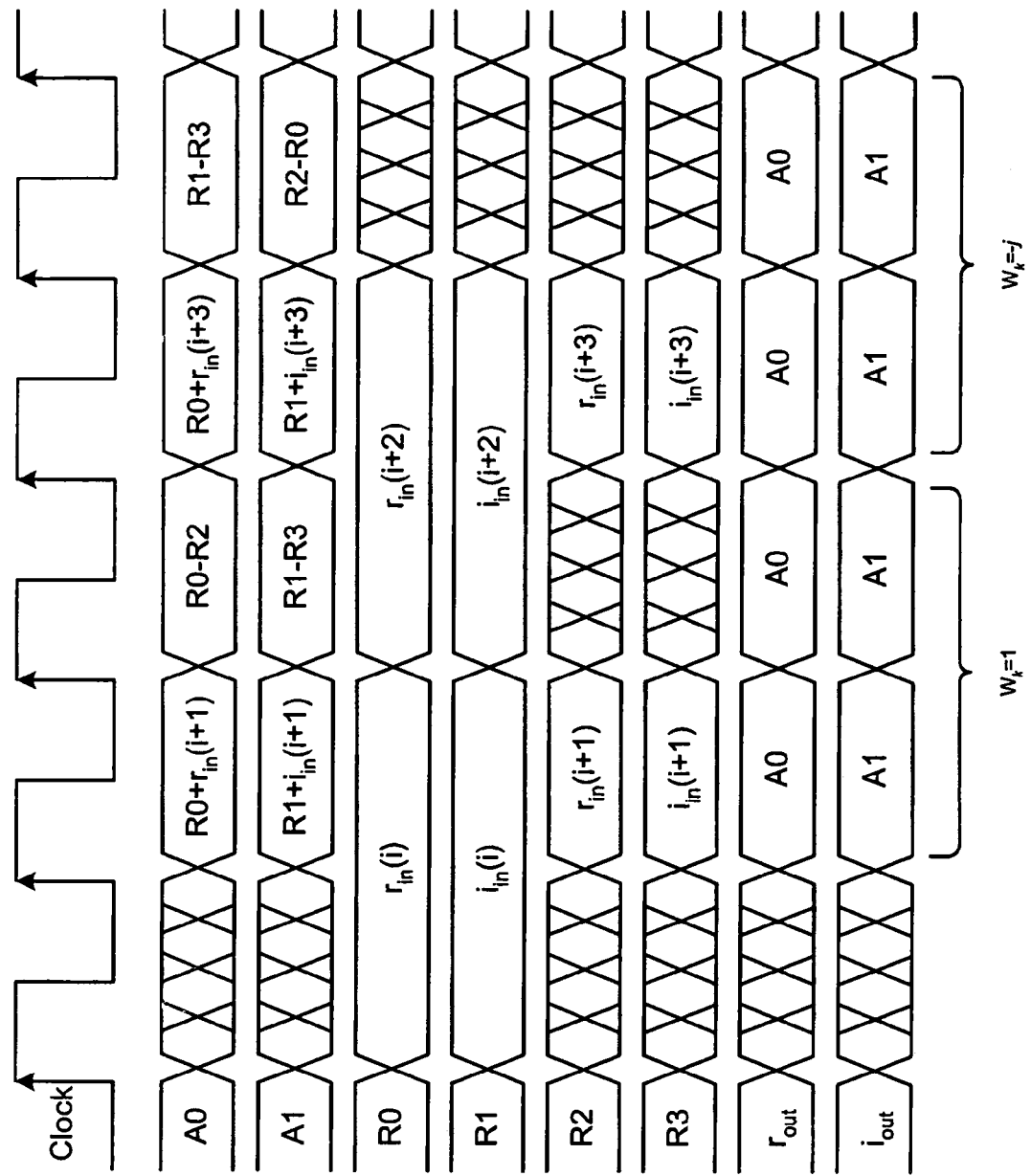
FIG. 13 is a signal diagram showing the use of each of the hardware components in the modified butterfly of FIG. 12.

The operation of the butterfly unit of FIG. 12 is best illustrated in conjunction with the timing diagram of FIG. 13. In a first clock cycle the butterfly receives the real and imaginary components of the $i^{th}$ sample and stores them respectively in registers R0 182 and R1 186. In the second cycle registers R2 184 and R3 188 receive the real and imaginary components of the $i^{th}+1$ sample. Additionally adder A0 190 sums the contents of R0 182 and the real component of the $i^{th}+1$ sample, while adder A1 192 sums the contents of R1 186 with the imaginary component of the $i^{th}+1$ sample. This addition provides the output A=a+b as shown in FIG. 8 as the output to adder 136. In the third clock cycle Adder A0 190 takes the difference between the contents of R0 182 and R2 184, while Adder A1 192 takes the difference between the contents of R1 186 and R3 188. This subtraction provides the output $B=W_k(a-b)$, as shown in FIG. 8 as the output to adder 138 and multiplier 140 where $W_k=1$. In this clock cycle the contents of R2 184 and R3 188 are deleted, while the contents of R0 182 and R1 184 are replaced by the $i^{th}+2$ real and imaginary components respectively. These cycles correspond to the twiddle factor of $W_k=1$ for k=0, and thus $BF_{II}$ 158 is logically structured identically to $BF_I$ 154. For the next two clock cycles $W_k=-j$, so a multiplexer is controlled to remap the connections to adders A0 190 and A1 192 to the configuration shown in FIG. 12.

In clock cycle 4, registers R2 184 and R3 188 are provided with the real and imaginary components of the $i^{th}+3$ sample respectively. Adder A0 190 provides as its output the sum of the contents of register R0 182 and the real component of the $i^{th}+3$ input, while adder A1 192 provides the sum of the contents of register R1 186 and the imaginary component of the $i^{th}+3$ input. Once again, this addition provides the output A=a+b as shown in FIG. 8 as the output to adder 136. In clock cycle 5, adder A0 190 takes the difference between the contents of register R1 186 and R3 188 while adder A1 192 takes the difference between R2 184 and R0 182. This difference corresponds to the output B=$W_k$(a−b), as shown in FIG. 8 as the output to adder 138 and multiplier 140 where $W_k$=−j. The butterfly operation is achieved without the use of a dedicated multiplier through the use of sign and component inversion. In the fifth clock cycle the contents of registers R0 182, R1 186, R2 184 and R3 188 are emptied to receive the next pairwise samples.

In order to extend this stage to support larger FFTs, during the $W_k$=1 mode the butterfly unit preferably performs N/2 butterfly operations, and then during the $W_k$=−j mode performs N/2 butterfly operations. The multiplexer control can then by handled by a simple modulus-N/2 counter. To allow for this presently preferred operation, the butterfly unit of the present invention is preferably preceded by an interleaver that groups data samples together so that all samples requiring a particular twiddle factor are provided to the butterfly unit in a continuous block.

BF2$_4$ 166 is a general purpose butterfly unit. This optionally implemented butterfly unit is used in the FFT processor of FIG. 9, in conjunction with properly sized interleavers, such as interleaver 168 to form the general purpose butterfly module 148, which is added to the FFT processor illustrated in FIG. 9 to allow for processing larger FFTs. The same general butterfly unit is implemented as BF2$n$ 150, as described in FIG. 8, which receives the input sequence of samples from a source 152. BF2$n$ 150 performs a single complex multiplication during each operation. A complex multiplication is comprised of four real multiplications and two real additions. Since data is being provided at one sample per clock cycle and a radix-2 butterfly requires two samples, two clock cycles are available to complete the complex multiplication and hence two real multipliers and a real adder are sufficient to the task of ensuring the one sample per clock cycle design assumption or criteria is met. As with the previously disclosed two modified butterfly units, BF2$_{II}$ 158 and BF2$_I$ 154, two complex additions must also be performed in two clock cycles, leading to the requirement of two additional real adders in the butterfly, giving a total butterfly requirement of 2 real multipliers and 3 real adders. The complex coefficients for the butterfly take the form C+jS, where C and S are determined by the equation:

$$W_k = e^{-\frac{j2\pi k}{N}} = \cos\left(\frac{-2\pi k}{N}\right) + j\sin\left(\frac{-2\pi k}{N}\right)$$

Figure 14:
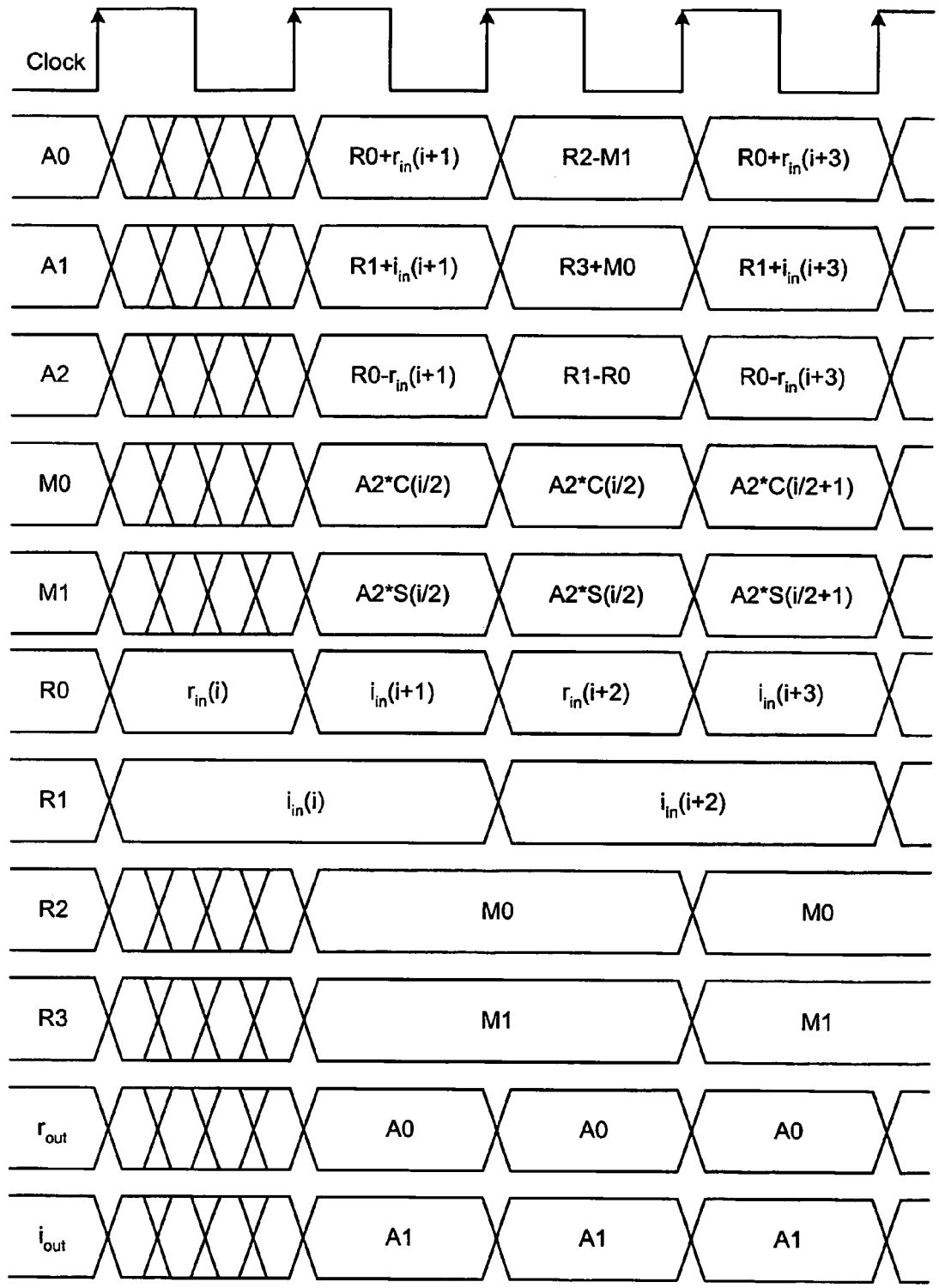
FIG. 14 is a signal diagram showing the use of each hardware component in a general purpose butterfly module of the present invention.

Because the block diagram for this circuit is overly complex, a signal diagram showing the use of each of the hardware components is provided in FIG. 14. From the signal diagram in FIG. 14, one skilled in the art will be able to derive a suitable implementation.

In the first clock cycle registers R0 and R1 receive the real and imaginary components of the $i^{th}$ input respectively. In the second clock cycle, adder A0 sums the contents of R0 and the real component of the $i^{th}$+1 input, A1 sums the contents of R1 and the imaginary component of the $i^{th}$+1 input, and A2 computes the difference between the contents of R0 and the real component of the $i^{th}$+1 input. Multiplier M0 computes the product of the output of A2 and C(i/2), while M1 computes the product of the output of A2 and S(i/2). R0 receives the imaginary component of the $i^{th}$+2 input, R2 receives the output of M0, while R3 receives the output of M1. The real component of the output is A0, while the imaginary component of the output is A1.

In the third clock cycle, adder A0 takes the difference between the contents of R2 and M1, A1 sums the contents of R3 and M0, and A2 takes the difference between the contents of R1 and R0. M0 and M1 take the same products that they did before, but with the new A2 contents. R0 and R1 receive the real and imaginary components of the $i^{th}$+2 sample. The real and imaginary outputs of the butterfly unit are A0 and A1 respectively.

In the fourth clock cycle adder A0 sums the contents of register R0 and the real component of the $i^{th}$+3 input, A1 sums the contents of register R1 and the imaginary component of the $i^{th}$+3 input, and A2 takes the difference between the contents of register R0 and the real component of the $i^{th}$+3 input. Multiplier M0 computes the product of the contents of A2 and C(i/2+1) and M1 computes the product of the contents of A2 and S(i/2+1). Register R0 receives the imaginary component of the $i^{th}$+3 input, R2 receives the result of multiplier M0, and R3 receives the output of M1. The real and imaginary components of the output signal are A0 and A1 respectively.

From the flow diagram of FIG. 7, the stage of the FFT performed by BF2$_{III}$ 162, requires four coefficients as defined by the equation:

$$W_k = \begin{cases} 1 & k = 0 \\ \frac{\sqrt{2}}{2} - j\frac{\sqrt{2}}{2} & k = N/8 \\ -j & k = N/4 \\ -\frac{\sqrt{2}}{2} - j\frac{\sqrt{2}}{2} & k = 3N/8 \end{cases}$$

In this implementation, the two multiplierless coefficients, as in the BF2$_{II}$ 158 butterfly, are present. In a one sample per cycle system, multiplication by the two additional complex coefficients can be implemented using an optimized single constant multiplier and a subtractor, rather than the two multipliers and adder-subtractor for the complex multiplication as in BF2$n$ 150. An implementation utilizing a single constant multiplier and a subtractor provides a simpler implementation with a reduced area.

Figure 15:
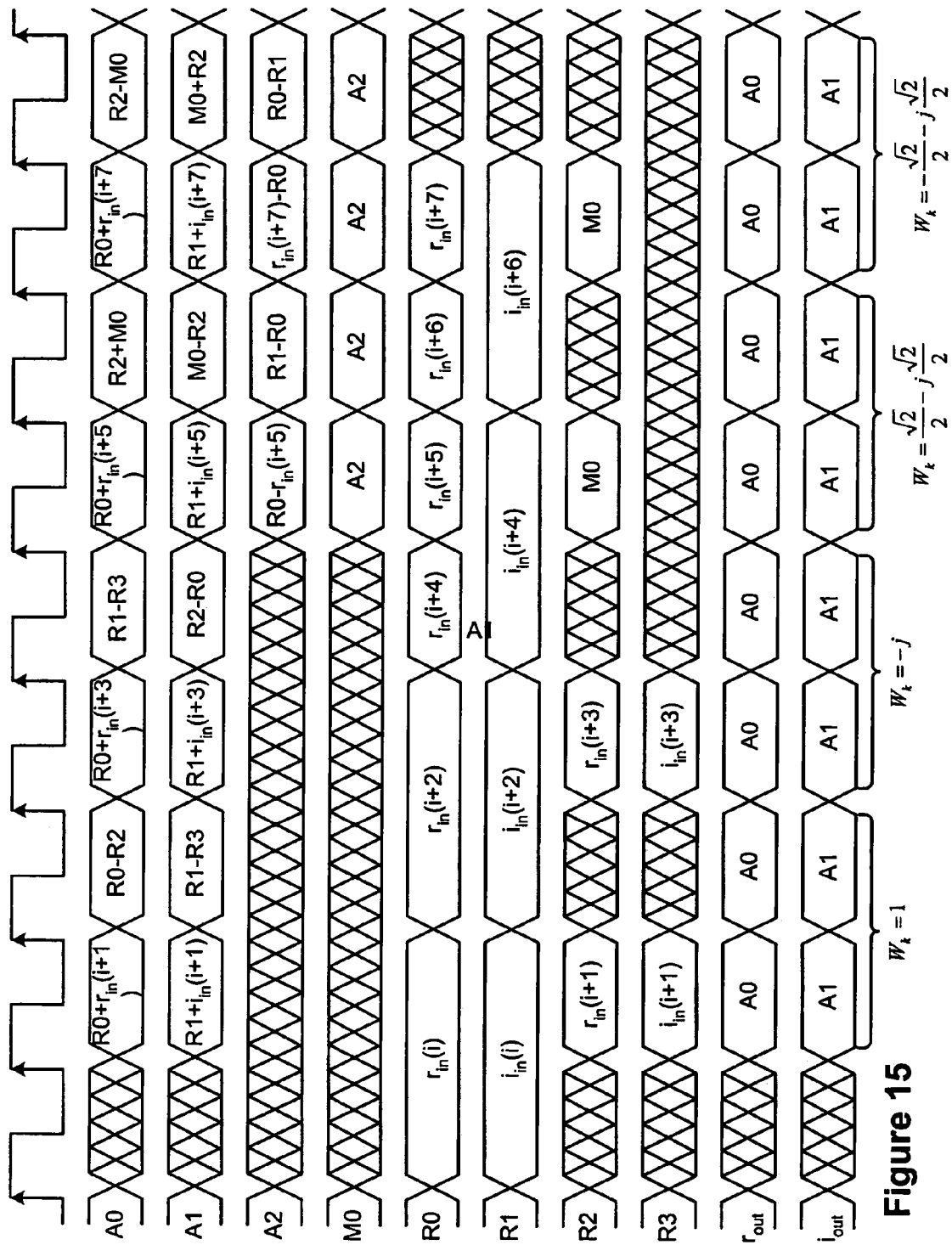
FIG. 15 is a signal diagram showing the use of each hardware component in an optimized butterfly module of the present invention.

The signal diagram of FIG. 15 illustrates the operational requirements of a circuit required to implement BF2$_{III}$ 162. One skilled in the art will appreciate that such a circuit can be implemented without undue experimentation.

There are four different states, or operational modes, shown in FIG. 15, one for each of the four coefficient multiplications that this butterfly must perform. The coefficients are preferably ordered in a bit-reversed fashion because the input sequence will be coming into this stage in bit-reversed order. To extend this implementation to higher than 8-point FFTs, these modes are clustered such that the butterfly unit will perform N/4 operations before switching to the next coefficient multiplication mode. This clustering can be achieved by the proper interleaving of the samples in I$_{2 \times N/8}$ 164. In the first dock cycle, registers R0 and R1 receive the real and imaginary components of the $i^{th}$ sample.

In the first operation mode, $W_k$=1. This corresponds to the second and third clock cycles. In the second clock cycle, adder A0 sums the contents of R0 with the real component of the $i^{th}$+1 input sample, and A1 sums the contents of R1 and the imaginary component of the $i^{th}$+1 input sample. Registers R2 and R3 receive the real and imaginary components of the $i^{th}$+1 sample respectively. The real and imaginary components of the output are A0 and A1 respectively. The output corresponds to A=a+b, the output of adder 136 in FIG. 8. In the third clock cycle, A0 takes the difference between the contents of R0 and R2, while A1 takes the difference between R1 and R3. R0 and R1 receive the real and imaginary components of the $i^{th}+2$ input sample respectively. The real and imaginary components of the output are A0 and A1, which corresponds to the output of multiplier 140 in FIG. 8, B=1(a−b).

The second operation mode has $W_k=-j$ and corresponds to the fourth and fifth clock cycles. In the fourth clock cycle, adder A0 sums the contents of R0 with the real component of the $i^{th}+3$ input sample, and A1 sums the contents of R1 and the imaginary component of the $i^{th}+3$ input sample. Registers R2 and R3 receive the real and imaginary components of the $i^{th}+3$ sample respectively. The real and imaginary components of the output are A0 and A1, corresponding to the output, A=a+b, of adder 136 in FIG. 8. In the fifth clock cycle, A0 takes the difference between the contents of R1 and R3, while A1 takes the difference between R2 and R0. R0 and R1 receive the real and imaginary components of the $i^{th}+4$ input sample respectively. The real and imaginary components of the output are A0 and A1, which corresponds to B=−j(a−b), the output of adder 138 and multiplier 140 in FIG. 8.

The third operation mode has $$W_k = \frac{\sqrt{2}}{2} - j\frac{\sqrt{2}}{2},$$

and corresponds to the sixth and seventh clock cycles. In the sixth clock cycle, adder A0 sums the contents of R0 with the real component of the $i^{th}+5$ input sample, A1 sums the contents of R1 and the imaginary component of the $i^{th}+5$ input sample and A2 takes the difference between contents of R0 with the real component of the $i^{th}+5$ input sample. Multiplier M0 multiplies the constant value by the contents of A2. Register R0 receives the real component of the $i^{th}+5$ input sample, and R2 receives the output of M0. The real and imaginary outputs are A0 and A1 respectively, corresponding to the output, A=a+b, of adder 136 in FIG. 8. In the seventh cycle, Adder A0 sums the contents of R2 and M0, A1 takes the difference between the contents of M0 and R2, and A2 takes the difference between R1 and R0. Multiplier M0 multiplies the constant value by the contents of A2. R0 and R1 receive the real and imaginary components of the $i^{th}+6$ sample. The real and imaginary outputs are A0 and A1 respectively, which corresponds to B=$W_k$(a−b), the output of multiplier 140 in FIG. 8.

The fourth operation mode has $$W_k = \frac{\sqrt{2}}{2} - j\frac{\sqrt{2}}{2},$$

and corresponds to the eighth and ninth clock cycles. In the eighth clock cycle, adder A0 sums the contents of R0 with the real component of the $i^{th}+7$ input sample, A1 sums the contents of R1 and the imaginary component of the $i^{th}+7$ input sample and A2 takes the difference between the real component of the $i^{th}+7$ input sample and the contents of R0. Multiplier M0 multiplies the constant value by the contents of A2. Register R0 receives the real component of the $i^{th}+7$ input sample, and R2 receives the output of M0. The real and imaginary outputs are A0 and A1 respectively, corresponding to the output, A=a+b, of adder 136 in FIG. 8. In the ninth cycle, Adder A0 takes the difference of the contents of R2 and M0, A1 sums the contents of M0 and R2, and A2 takes the difference between R0 and R1. Multiplier M0 multiplies the constant value by the contents of A2. The real and imaginary outputs are A0 and A1 respectively, which corresponds to B=$W_k$(a−b), the output of multiplier 140 in FIG. 8.

The architectures of the above described modified butterflies allow for an implementation in a reduced area as there has been a reduction in the number of components required. Furthermore, the reduction in the component count can be used to decrease the power consumption of the FFT processor in operation. In addition, the coefficient clustering in an out-of-order input FFT reduces the switching requirements of the block, resulting in reduced power consumption for the FFT over in-order architectures. As noted above, the clustering is achieved by selection of an interleaver that provides samples to the butterfly unit in such an order that all pairs of samples requiring the same coefficient are provided as contiguous groups.

The interleaver architecture described in the following part was developed by considering the operation of the butterfly units, which accept a single complex input each clock cycle and generate a single complex output each clock cycle. The output data for one stage is passed into a memory interleaver block, such as interleavers 156, 160 and 164, as shown in FIG. 9, and after the appropriate memory storage period, is then removed and used by the next butterfly stage to perform the butterfly operation required.

Figure 16:
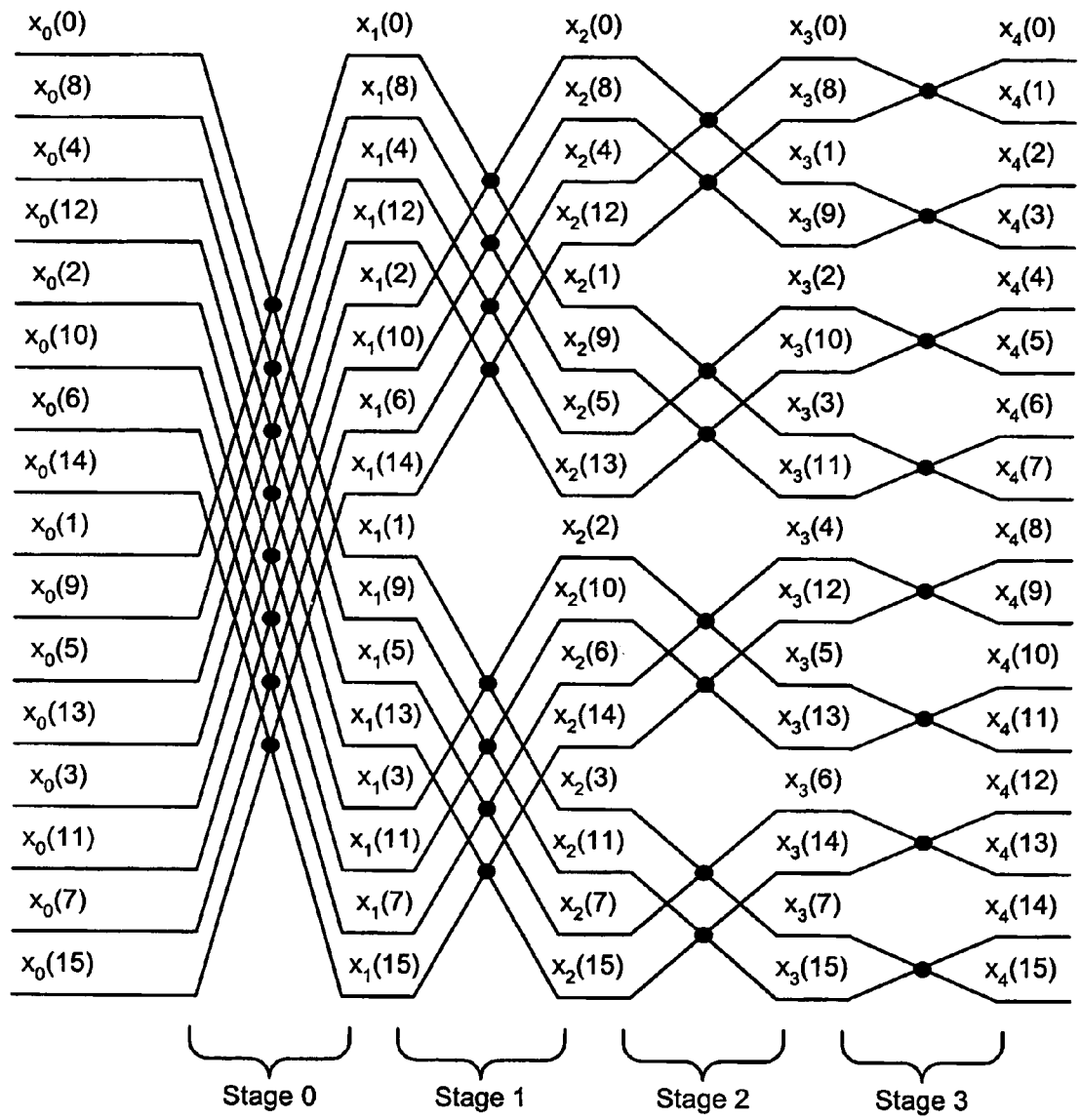
FIG. 16 is a flow graph for a 16 point R2SDP FFT of the present invention.

The input to the FFT processor is assumed to come in bit-reversed form, so for instance the signal x(0) will arrive first, followed by the signal x(8). The timing diagram in FIG. 16 shows the data flow of a 16-point FFT with signal timing information for an R2SDP FFT implementation. Note that each signal takes the general form $x_s(t)$ where s is the signal's stage and t is the zero-based arrival time for that signal in its stage.

In the first stage, Stage 0, signals 1 cycle apart, such as $x_0(0)$ and $x_0(1)$, are combined in a butterfly to produce two results. In Stage 1, signals 2 cycles apart are combined and Stage 2 signals that are separated by 4 clock cycles are combined. This pattern of doubling the signal separation continues in the FFT until the final butterfly stage is reached, at which point a delay of N/2 cycles is required in order to perform the final butterfly. In order to generate the appropriate delay at least M registers or RAM entries (where M is the delay at the given stage) are required to generate the delay.

For a 16 point FFT implementation of the processor illustrated in FIG. 9, the $I_{2 \times N/2}$ interleaver 160 would be an $I_{2 \times 8}$ memory interleaver block. In designing an interleaver, several considerations must be taken into account. One objective of the interleaver of the present invention is to avoid both large numbers of storage elements and complex memory addressing systems used to ensure that a storage element is not re-used until its contents have been read out. The interleaver presented below reduces the number of required storage elements, or memory locations, to ½ the size of the data sequence length. Thus, 8 samples can be interleaved in the $I_{2 \times 8}$ using only 4 memory locations (assuming that each sample is sized to fit in one memory location). A signal timing diagram for an $I_{2 \times 8}$ interleaver, such as interleaver 160, is shown in FIG. 17.

The $I_{2 \times 8}$ memory interleaver 160 allows signals four clock cycles apart to be butterflied together by storing the first four signals that enter the interleaver and then by interleaving these stored signals with the next four signals that enter the block. In a general interleaver block the first n/2 signals are stored and then are interleaved with the next n/2 signals. The general input pattern of $x_0, x_1, x_2, \ldots, x_{n/2-1}, x_{n/2}, x_{n/2+1}, \ldots, x_{n-1}$ is permuted to provide the interleaver output pattern of $x_0, x_{n/2}, x_1, x_{n/2+1}, \ldots, x_{n/2-1}, x_{n-1}$.

Figure 17:
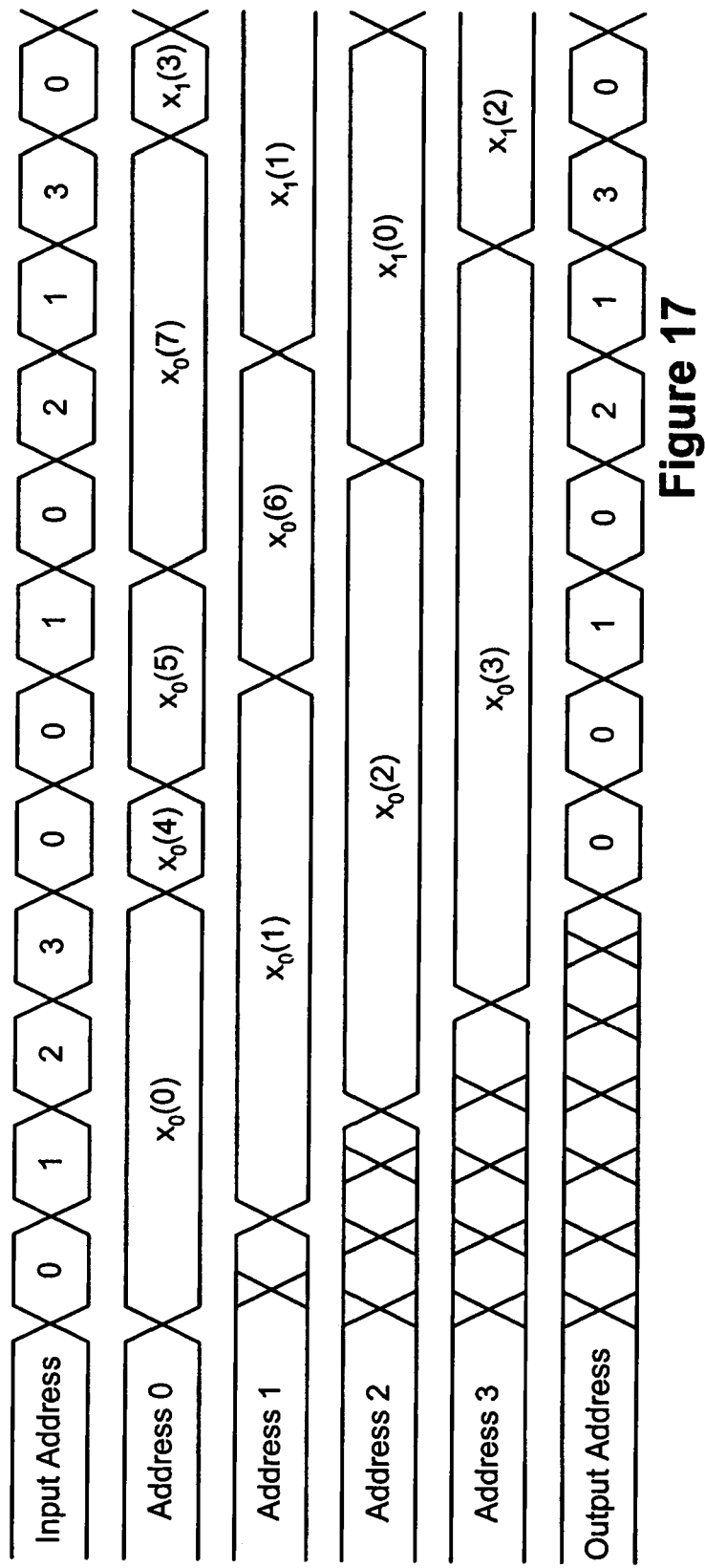
FIG. 17 is a memory timing diagram for the $I_{2\times 8}$ memory interleaver of the present invention.

In the timing diagram of FIG. 17, it is assumed that the memory of $I_{2\times 8}$ 160 is initially loaded in sequential order, though this is not necessary. Once the interleaver has been filled, data is read out of the interleaver and input data is directed to the same place as the most recently read data to avoid overwriting valid data.

$I_{2\times 8}$ 160 can be used to interleave eight symbols in four memory locations. Each cycle a new input is passed into the interleaver and once the fifth signal arrives, each cycle thereafter a new output is also generated by the interleaver. In this example, the input sequence $x_0(0), x_0(1), x_0(2), x_0(3), x_0(4), x_0(5), x_0(6), x_0(7)$ is interleaved to produce the output sequence $x_0(0), x_0(4), x_0(1), x_0(5), x_0(2), x_0(6), x_0(3), x_0(7)$. The first four symbols are placed into memory locations determined by the sequential addresses 0, 1, 2, and 3 in the first four clock cycles. As the fifth input symbol arrives into the interleaver, the first input symbol which was stored in address 0 is being read and removed. This means that $x_0(4)$ can be placed into memory address 0 overwriting the now stale contents. In a presently preferred embodiment, the memory is a dual port register file, having unique read and write ports.

Similarly, the remaining three inputs, $x_0(5)$ through $x_0(7)$, are placed in memory locations as those locations become available. The final input address pattern for the eight incoming signals is 0, 1, 2, 3, 0, 1, 0, 0.

Assuming that the input data is continuous and without pause, the memory will not be completely available by the time the next eight input symbols begin to arrive. The first symbol in the second set of input data, $x_1(0)$ will need to go into the available memory location which is address 2. Similarly, the remaining three entries for the first half of the input data will go into the available memory locations 1, 3, and 0. The remaining four incoming data values, $x_1(4)$ through $x_1(7)$, will follow a similar pattern to the second half of the previous eight input values. The resulting input address pattern for the second eight incoming values is 2, 1, 3, 0, 2, 2, 1, 2. Though the third set of eight incoming values has a new order, the overall pattern is periodic and repeats every $\log_2 N$ input patterns.

A sequence of n input data is broken into two distinct sequences in the interleaver. The first n/2 input data values fill the available n/2 memory locations from the previous operation and the second n/2 input values fill the available n/2 memory locations from the current operation. These two sets of n/2 input data are interleaved together performing a single interleave operation that produces one output symbol per cycle to match the data rate of the incoming data stream.

The addresses of the second half of the input data, relative to the addresses filled in the first half of the operation, follow a very distinct pattern. In order to observe this result, consider the first memory interleaving operation described above (i.e. 0, 1, 2, 3, 0, 0, 1, 0). The addresses of the second half of the input data can also be described in terms of relationship position to previous inputs. The signals $x_0(4), x_0(5), x_0(7)$ go into the memory position of the original input signal $x_0(0)$. The signal $x_0(6)$ goes into the memory position of the original input signal $x_0(1)$.

The same behavior is observed in the second set, and all remaining sets, of input data. In a similar fashion, the first four inputs of the second input data set, $x_1(0)$ through $x_1(3)$, can be compared with the first four inputs of the first input data set, $x_0(0)$ through $x_0(3)$. Signal $x_1(0)$ follows signal $x_0(2)$; signal $x_1(1)$ follows signal $x_0(1)$ and so forth. It can be shown by further extending this memory timing diagram into the third set ($x_3(n)$) that these positional relationships hold true for the first N/2 signals in any interleaver.

Figure 18:
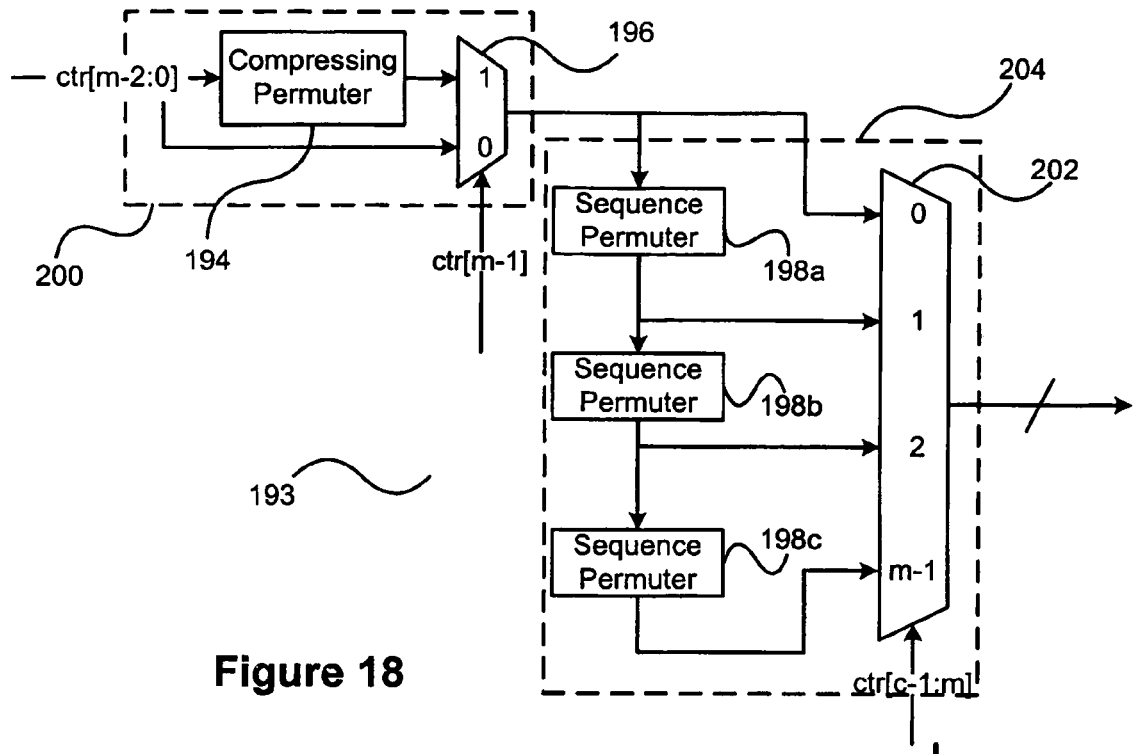
FIG. 18 is a block diagram of a memory address generator for use in an interleaver of the present invention.

To determine the transition pattern between the addresses used to store the first half of the data sequence, and the addresses used to store the first half of the immediately preceding data sequence, a listing of the memory addresses used, and the order in which they are used can be extracted from FIG. 17. This extracted list shows that memory locations 2, 1, 3 and 0 are used to hold the first four samples of the second data sequence. Thus, 2, 1, 3, 0 forms the transition pattern between first halves of data sequences. This pattern can then be applied successively to later first halves of input data sequences in order to determine the appropriate location for the data. In concert with the first second half pattern, 0, 0, 1, 0, the $I_{2\times 8}$ memory interleaver can be extended to length M patterns for an $I_{2\times M}$ memory interleaver. The addresses used by the interleaver are described by the sequence 0, 0, 1, 0, 2, 1, 3, 0, ... which appears in Sloane's Encyclopedia of Integer Sequences as sequence A025480. This sequence is described by the equation $$f(x) = \left(\frac{(x+1)}{g(x+1)} - 1\right)\bigg/ 2;$$

where g(x) is described by the equation g(x)=x&-x and where x is the position of the sample in the input sequence. g(x) performs the bitwise-and of an input value and its sign inverse. The result of g(x) is the greatest odd divisor of x, which in turn is the largest value that x is divided evenly by, the division resulting in the smallest odd numbered divisor. When restricted to binary operations, g(x) provides as a result, the power of 2 that can be used to divide x by to remove all trailing zeros. f(x) can also be described by the modified form $$f(x) = \frac{x}{2^{\log_2(g(x+1))+1}},$$

which is used to model the interleaver address generator 193 illustrated in FIG. 18. This rewriting of f(x) takes base-2 operations into account to provide a simplified representation of the equation.

In order to capture the behavior of the first n/2 and second n/2 signals in a single interleaving input stream, two types of pattern permutation units need to be described, a compressing permuter and a sequence permuter. Compressing permuter 194 handles the placement of the second n/2 signals in the input data stream into the appropriate locations (in the example above, modeling the sequence 0, 0, 1, 0) having the effect of compressing the memory requirements for a single permutation operator by a factor of two. $\log_2 N$ sequence permuters 198a-198c are then used to handle the placement of the first n/2 signals by offsetting the output of compressing permuter 194 to account for the transition pattern.

Each of the sequence permuters 198a-c offsets the value of the previous permutation thereby allowing successively later input permutation sequences to be placed in the correct memory location (without overwriting unused data). The compressing permuter for a stage m interleaver $I_{2\times 2^m}$ is described by the equation $c_m(x)=f(d_m(x))$, where $f(x)$ is the sequence generating equation previously shown and $d_m(x)$ is defined as $d_m(x)=x \bmod 2^{m-1}$.

The following complete compressing permuter equation describes the procedure used to generate the addresses for the first interleaver operation:

$$c_m(x) = \begin{cases} x & , 0 \le x \bmod 2^m < 2^{m-1} \\ 2^m \lfloor \frac{x}{2^m} \rfloor + f(d_m(x)) & , 2^{m-1} \le x \bmod 2^m < 2^m \end{cases}.$$

The output of the complete compressing permuter 200 is fed directly into the first sequence permuter 198a. The addition of the term $2^m \lfloor x/2^m \rfloor$ to the compressing permuter allows the data to be set up such that the sequence permuters will produce the correct results across all input signal values x. Complete compressing permuter 200 uses multiplexer 196 to switch between the two states, and is described in more detail below.

$s_m(x)=f(2^{m-1}+d_m(x))$ describes the behavior of a single sequence permuter such as sequence permuter 198a-c. The addition of $2^{m-1}$ and the input value to the sequence generating equation is the same as looking forward in the generated sequence by N/2 values. In terms of the previous example, this permuter generates the sequence 2, 1, 3, 0, which is the address translation sequence described above. The address generator 193 requires m serially connected sequence generators in order to produce the output pattern for all sequences until repetition is encountered. The final address generator is described by the equation $p_m(x)=r_m(c_m(x))$, where $c_m(x)$ is the complete compressing permuter equation described above, and is used as the input to the remainder of the memory interleaver address generator. The equation below describes the remainder of the address generation circuit $$r_m(x) = s_m^{\lfloor \frac{q_m(x)}{2^m} \rfloor}(d_m(x)),$$

where $q_m(x)=x \bmod(m2^m)$.

In this circuit, the notation $s^y(x)$ describes a series of nested equations where y determines the nesting depth. For instance, $s^0(x)=x$, $s^1(x)=s(x)$, $s^2(x)=s(s(x))$, $s^3(x)=s(s(s(x)))$ and so forth. This function utilizes the definition of the modulus operator $d_m(x)$ previously defined and the sequence permuter equation $s_m(x)$.

These equations can be implemented in hardware as shown in the block diagram of FIG. 18. This implementation is preferably connected between an address counter and the address lines of a memory unit, such as a dual-port register file. In this implementation, the compressing permuter 194 and the following multiplexer 196 implement the equation $c_m(x)$ and form complete compressing permuter 200. The output of complete compressing permuter 200 serves as the input to the remaining blocks as seen in the equation for $p_m(x)$ where $r_m(x)$ implements the sequence permuters 198a-c and final multiplexer 202 of the complete sequence permuter 204. In the complete sequence permuter 204 there are m sequence permuters 198a-c, each of which implements the equation for $s_m(x)$. Since the selection of a sequence permuter block is defined by $q_m(x)=x \bmod(m2^m)$, it is necessary to have a modulus-m$2^m$ counter for the complete sequence permuter 204. In FIG. 18, counter signal ctr is used to control multiplexers 196 and 202, and is used to provide the input value x to the equation $p_m(x)$. Multiplexer 196 differentiates the two cases in the equation $c_m(x)$ which describes the behavior of complete compressing permuter 200. The selection of input bits, ctr[m-2:0], into the complete compressing permuter 200 removes the complexity of the $2^m \lfloor x/2^m \rfloor$ term and the remaining term is an implementation of the sequence generator $f(x)$.

Figure 20:
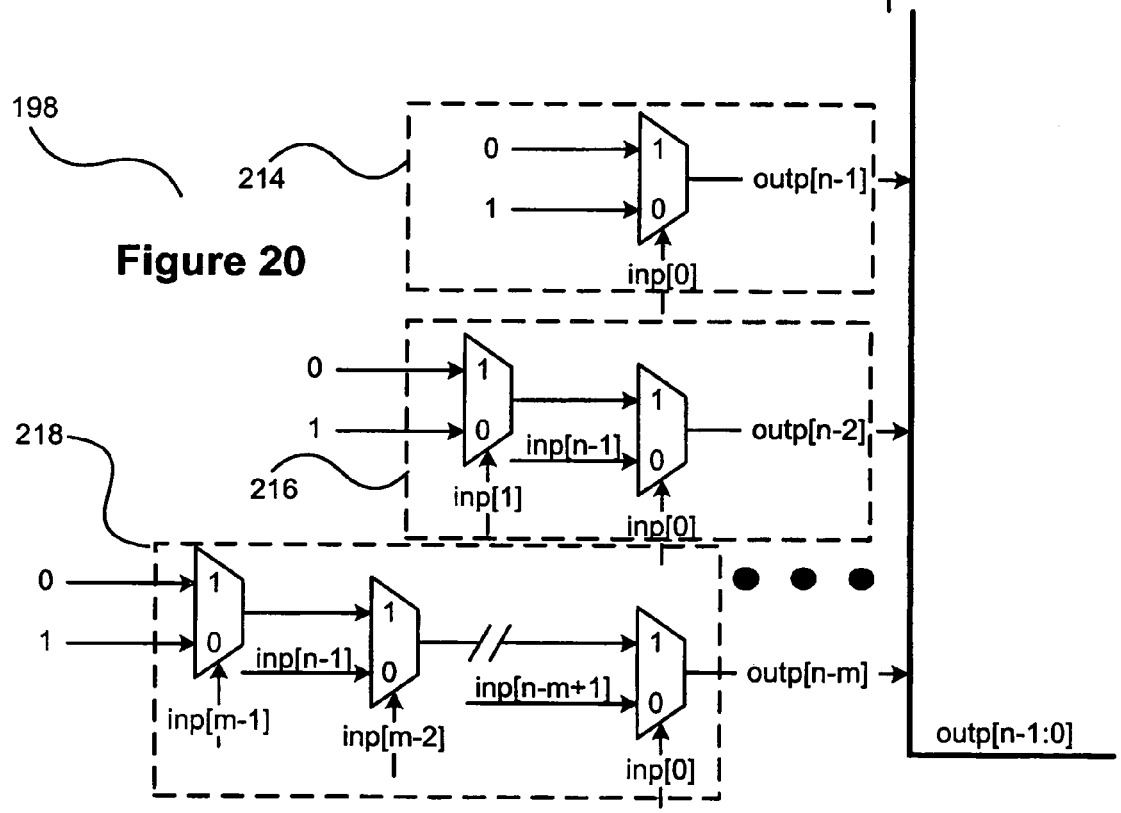
FIG. 20 is a block diagram illustrating a sequence permuter for use in an interleaver of the present invention.
Figure 19:
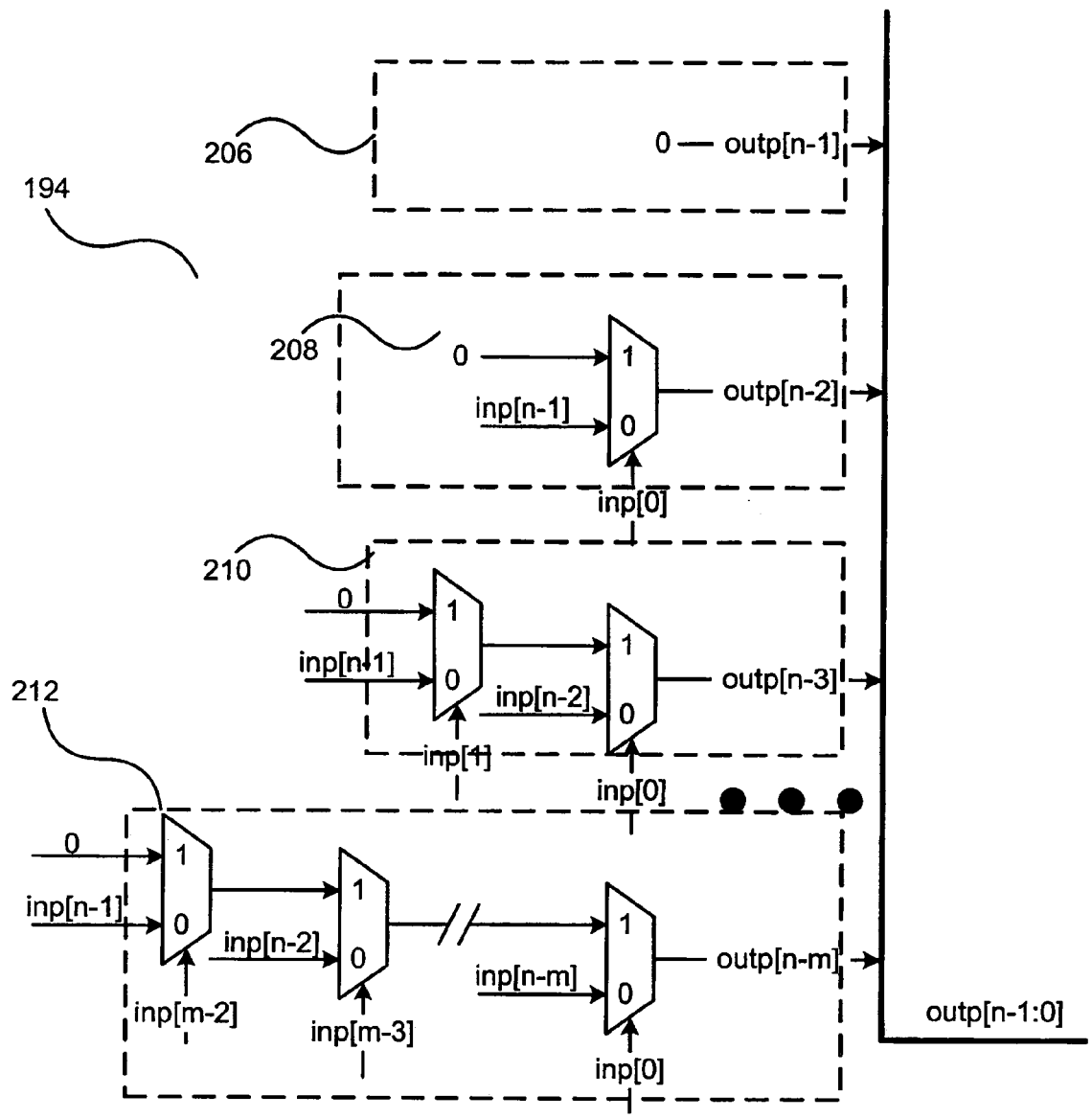
FIG. 19 is a block diagram illustrating a compressing permuter for use in an interleaver of the present invention.

The implementation of the sequence permuter 198 is also based upon the same sequence generator equation $f(x)$ with the addition of a $2^{m-1}$ term. This term can be implemented either directly or by realizing that the addition of the $2^{m-1}$ term is the same as adding a power-of-two decreasing signal to the top of the selectively shifted output as shown in FIG. 20. Shifters 214, 216 and 218 are each receive 0 and 1 as inputs to the 1 and 0 data ports of a first multiplexer. The number of multiplexers in each shifter increases from shifter 214 having 1 multiplexer to shifter 218 having m multiplexers. In shifters having more than 1 multiplexer, the output of each multiplexer is provided as the input to 1 port of the next multiplexer. Control of the multiplexer is handled by the inp[x] signal.

Figure 21:
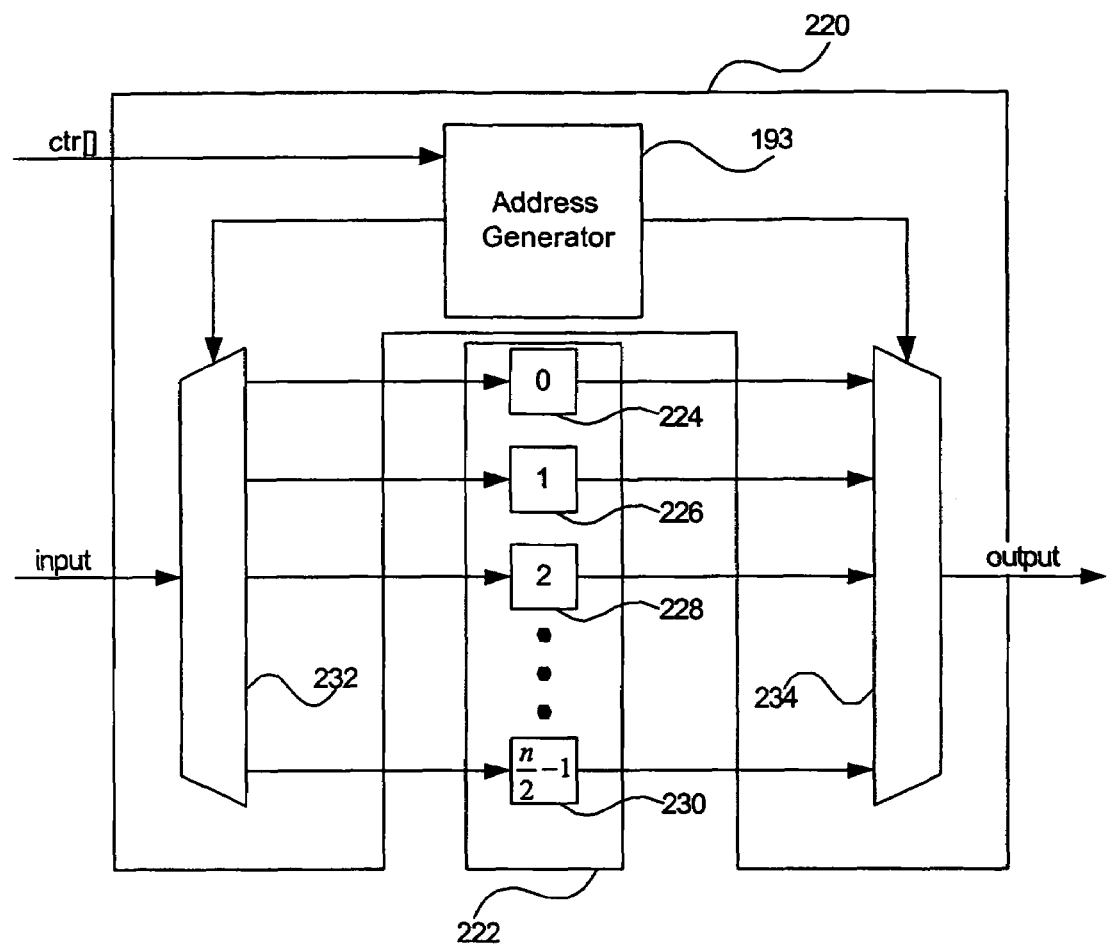
FIG. 21 is a block diagram illustrating an exemplary interleaver of the present invention.

FIG. 21 illustrates the use of the address generator 193 of the present invention in an interleaver memory such as interleavers 156, 160, 164 and 168. As each sample in the sequence of samples arrives, it is received by the interleaver controller 220. The interleaver contains both interleaver controller 220 and a plurality of memory cells, or storage elements 222. Interleaver controller 220 determines a storage address for each incoming sample, reads out the data in the storage address, and sends the received sample to the determined storage address. This allows for re-use of a memory element, such as elements 224, 226, 228 and 230, after it has been read out. Interleaver controller 220 includes address generator 193, which is preferably implemented as described above, and multiplexers 232 and 234. Multiplexer 232 receives the samples from the input channel, and routes them to one of the plurality of memory elements 222 in accordance with the address generated by address generator 193. Multiplexer 234 receives the same address from address generator 193, and reads out the data stored in the addressed memory element. Thus, address generator 193 not only generates the addresses to which data is saved, but also generates the addresses from which data is read, which allows the output channel to transmit the permuted sequence. Address generator 193 has as an input ctr[], which allows for synchronization with the input sequence of samples. By using this configuration it is possible to reduce the number of memory elements to n/2−1.

Figure 22:
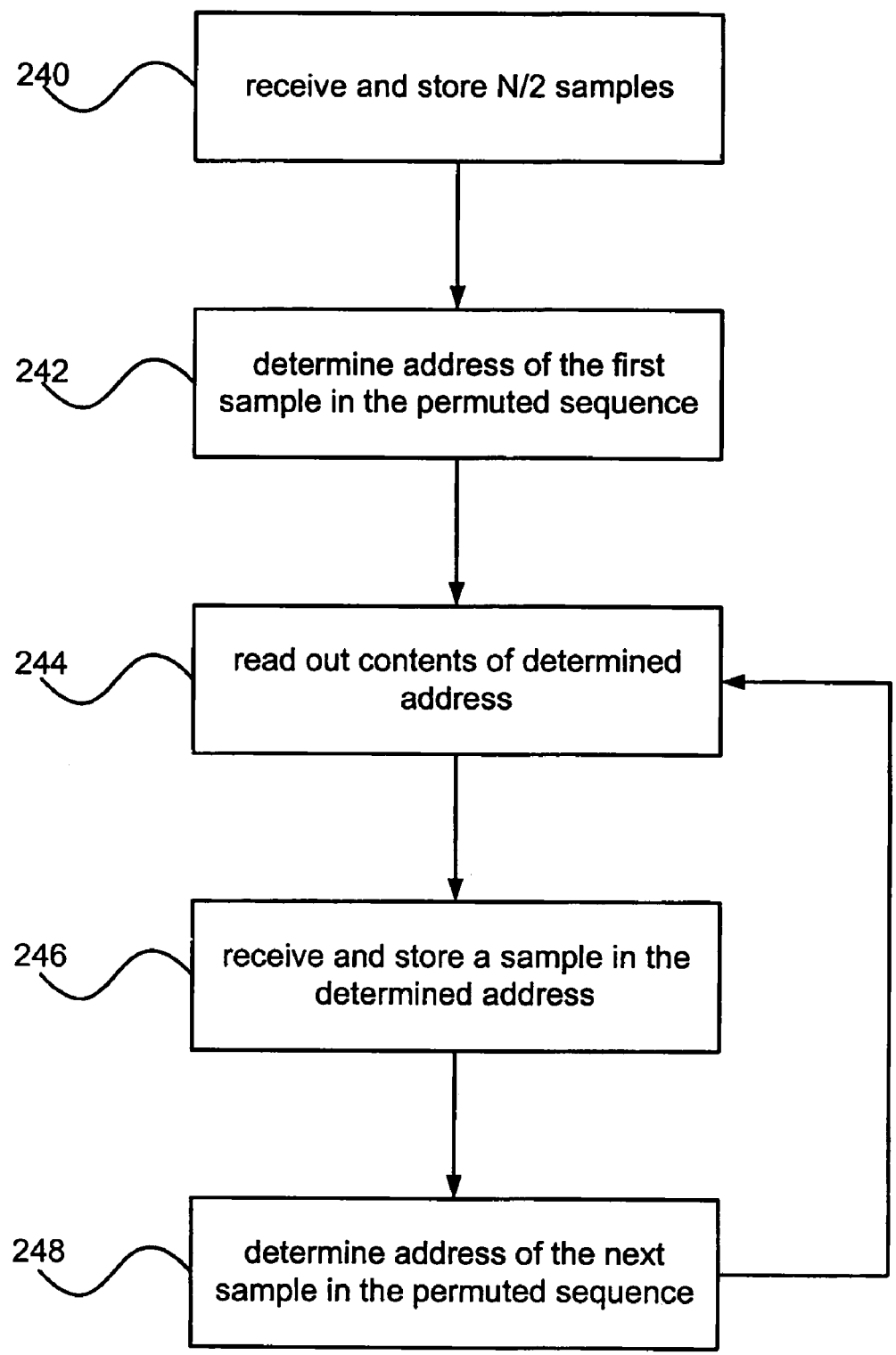
FIG. 22 is a flow chart illustrating an exemplary method of interleaving according to the present invention.

FIG. 22 illustrates a method of interleaving according to the present invention. In step 240, a predetermined number of samples are received and stored in the memory. In a presently preferred embodiment, n/2 samples are stored, and the capacity of the memory is n/2 to achieve 100% utilization of the allocated resources, however one skilled in the art will appreciate that the number of stored elements is determined by the maximum distance between two input samples that are adjacent in the permuted output sequence. As the above described embodiment of the present invention receives the input sequence $x_0, x_1, x_2, \ldots, x_{n/2-1}, x_{n/2}, x_{n/2+1}, \ldots, x_{n-1}$ and permutes it to provide the interleaver output pattern of $x_0, x_{n/2}, x_1, x_{n/2+1}, \ldots, x_{n/2-1}, x_{n-1}$, the maximum distance is n/2, though other permuter patterns would have greater or smaller distances. In a presently preferred embodiment, the first n/2 samples are stored in sequential memory addresses, so that the first sample $x_0$ would be stored in memory address 0, as shown in the timing diagram of FIG. 17. In step 242, the address of the memory element storing the first sample in the permuted sequence is determined. In step 244 and 246, the contents of the memory element at the determined address are read out, and replaced with a newly received sample. One skilled in the art will appreciate that these two steps can be performed sequentially or in parallel, so long as the contents of the memory element are not overwritten prior to being read out. In step 248, the address of the next sample in the permuted sequence is determined, and the process returns to step 244. Thus, as incoming samples are received they are placed in the memory element storing the sample that is read out. One skilled in the art will appreciate that though preferably n/2 samples are initially stored in step 240, the actual number of samples that has to be stored is determined by the maximum distance between samples, and the permuted output order of the samples.

In another embodiment, a single dual port memory is used in the interleaver along with two address generators. The first address generator is used to determine the address to which data will be written, while the second generator is used to determine the address from which data is read out. This allows the system to continue reading out data while the input sequence has gaps. When the input sequence has a gap, the input data stops and no new data is stored in the interleaver. This will result in the generated input address diverging from the output addresses because there is no progress made on the input addresses, while the output addresses are still generated and read out from. To allow the controllers to avoid overwriting data when the input sequence resumes, a connection from the write counter (ctr) into the read controller is required. The read controller can then use this signal to determine if data is available for reading (i.e. by comparing the write ctr to the read ctr). In this embodiment, the write controller writes data every time data is presented to it. The read controller monitors the amount of data that has been written and begins reading when the first n/2 samples have been written. At this point the read is driven by the input data presentation, however once the full n samples have been written to the memory unit the read controller then continuously dumps the presented output data regardless of whether input data is presented or not. One skilled in the art will appreciate that such an embodiment can be implemented using two address generators 193, as described above, one for the read address generator and one for the write address generator. The two address generators 193 would be connected to each other, so that the read controller can determine if data is available, either by determining that the required sample has been stored, or that a complete n samples have been stored.

Such an interleaver architecture allows the write address generator to determine a storage address for a received sample, while the read address generator determines the storage address associated with the next output sample. The connection between the two address generators allows a comparison of the read and write counters to allow the write address generator to avoid overwriting valid data, while allowing the read address generator to determine which addresses contain valid data to allow for reading out the memory addresses in the correct order.

Though initially developed for use with the related FFT processor described above, the interleaver of the present invention can be used in a number of other environments. Due to its ability to group samples, and its reduced memory requirement, the above described interleaver is applicable to, but not limited to, use in other discrete transform applications, such as z-transform processors and Hadamard transform processors.

A comparison of the hardware requirements of the prior art pipeline processor FFT architectures is shown in Table 1. In order to ease comparisons of radix-2 with radix-4 architectures all values in Table 1 have been listed using the base-4 logarithm. The results show that the R2SDP architecture of this invention reduces the requirement for complex multipliers, complex adders, and memory allocation with out-of-order input data. With in-order input data the memory size doubles in order to implement a buffer to generate the bit-reversed data sequence for the FFT processor. The address generation scheme of the R2SDP design is more complex than a simple R2SDF or R2MDC implementation, however the requirements for the rest of the system are significantly smaller than those two implementations, offsetting the area and cost of the extra controls.

TABLE 1

|        | # of Multipliers | # of Adders | Memory Size |
|--------|------------------|-------------|-------------|
| R2MDC  | $2(\log_4 N-1)$  | $4 \log_4 N$ | $3N/2-2$   |
| R4MDC  | $3(\log_4 N-1)$  | $8 \log_4 N$ | $5N/2-4$   |
| R2SDF  | $2(\log_4 N-1)$  | $4 \log_4 N$ | $N-1$      |
| R4SDF  | $\log_4 N-1$     | $8 \log_4 N$ | $N-1$      |
| R4SDC  | $\log_4 N-1$     | $3 \log_4 N$ | $2N-2$     |
| R2²SDF | $\log_4 N-1$     | $4 \log_4 N$ | $N-1$      |
| R2SDP  | $\log_4 N-1$     | $3 \log_4 N$ | $N-1$      |

A radix-4 implementation ("R4SDP") utilizing interleavers extended for the purpose can achieve a multiplier count of 75% that described for the radix-2 algorithm by removing redundant multiplications. Similarly, a radix-8 design following this invention can achieve a reduced multiplier count of 66% that described for the radix-2 design by further reducing redundant multiplications.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A fast Fourier transform (FFT) processor for performing an FFT on a series of input samples organized as pairs, the processor comprising:
    a first butterfly unit for receiving the series of input samples, for performing a first butterfly operation on each received pair of the series of input samples to provide a serial output;
    an interleaver for receiving the serial output of the first butterfly unit, for permuting samples in the serial output to provide an output sequence organized as a pairwise series of samples the interleaver comprising
        a plurality of memory elements, each element having a write storage address for storing a sample from the serial output, wherein the number of memory elements is less than the number of samples in the serial output, and
        an interleaver controller for receiving a sample from the serial output, determining the write storage address of one of the plurality of memory elements for storing the sample, writing the sample to the memory element associated with the determined write storage address, determining a read storage address associated with a memory element, and reading out the sample stored in the memory element associated with the determined read storage address to provide a sample of an output sequence, wherein the samples from the serial output are interleaved in accordance with a non-repeating pattern; and a second butterfly unit for serially receiving the output sequence from the interleaver, for performing a second butterfly operation on each pair of samples in the pairwise series of samples of the output sequence to obtain an output series of samples corresponding to an FFT of the series of input samples.

2. The FFT processor of claim 1 wherein the second butterfly unit is a modified butterfly unit and includes a set of adders for receiving real and imaginary components of each sample of the output sequence, and for performing the second butterfly operation using the received real and imaginary components of each sample of the output sequence.

3. The FFT processor of claim 1 wherein the first butterfly unit is a modified butterfly unit and includes:
a multiplexer for receiving the series of input samples, for swapping real and imaginary components of selected samples in the series of input samples and for providing the selectively swapped components as an output; and
a set of adders, for performing the first butterfly operation using the selectively swapped components from the multiplexer.

4. The FFT processor of claim 3 further including a modulo counter for controlling the multiplexer to perform component swapping on one half of the input samples of the received series of input samples.

5. The FFT processor of claim 1 further including:
a modified butterfly unit for receiving the series of input samples, for performing a modified butterfly operation on each received pair of samples to provide a serial output; and
a further interleaver for receiving the serial output of the modified butterfly unit, for permuting the samples in the serial output of the modified butterfly to provide permuted samples as the input series to the first butterfly module.

6. The FFT processor of claim 5 wherein the modified butterfly unit includes:
a multiplexer for selectively swapping real and imaginary components of the pairs of samples;
a set of adders, for performing the modified butterfly operation using the selectively swapped components from the multiplexer; and
a constant multiplier for selectively applying a constant twiddle factor to the result of the modified butterfly operation and for providing the selectively multiplied result to the further interleaver.

7. The FFT processor of claim 1 wherein the first and second butterfly modules are both multiplierless butterfly units for performing butterfly operations on the received pairs of input samples.

8. The FFT processor of claim 1 wherein the interleaver includes:
an addressable memory for receiving and storing the serial output of the first butterfly module; and
an address generator for generating memory addresses at which each result from the first butterfly can be stored.

9. The FFT processor of claim 8 wherein the addressable memory is sized to store one half of the serial output of the first butterfly module.

10. The FFT processor of claim 8 wherein the interleaver further includes a complete compressing permuter for providing the address generator with memory addresses for the first half of the serial output of the first butterfly module.

11. The FFT processor of claim 10 wherein for an $x^{th}$ sample in the serial output, the complete compressing permuter generates an address in accordance with the formula $$c_m(x) = \begin{cases} x & , 0 \leq x \bmod 2^m < 2^{m-1} \\ 2^m \left\lfloor \frac{x}{2^m} \right\rfloor + f(x \bmod 2^{m-1}) & , 2^{m-1} \leq x \bmod 2^m < 2^m \end{cases},$$

where $2^m$ is the size of the addressable memory, and $$f(x) = \frac{x}{2^{\log_2(g(x+1))+1}},$$

where $g(x)$ is the bitwise-and of the sample and its sign inverse.

12. The FFT processor of claim 11 wherein the complete compressing permuter includes:
a compressing permuter for determining an address in accordance with $$2^m \left\lfloor \frac{x}{2^m} \right\rfloor + f(x \bmod 2^{m-1});$$

and
a multiplexer for switching between the address determined by the compressing permuter and an address determined in accordance with the position of the sample in the serial output.

13. The FFT processor of claim 11 wherein the address generator includes a sequence permuter for shifting the address generated by the complete compressing permuter to prevent overwriting data not provided to the second butterfly unit.

14. A single path delay fast Fourier transform (FFT) processor for performing an FFT on a series of input samples organized as pairs, the processor comprising:
a plurality of butterfly modules connected in series each having a memory for receiving the series of input samples and an associated butterfly unit for performing butterfly operations on the series of input samples in the memory, the first butterfly module in the plurality for receiving and storing the series of input samples in memory, the final butterfly module in the plurality for providing a butterfly operation output as a series of samples corresponding to an FFT of the series of input samples; and
at least one of the plurality of butterfly modules having an interleaving memory for receiving and storing a serial output resulting from performing a butterfly process on the series of input samples received by the at least one of the plurality of butterfly modules having an interleaving memory, and for permuting the series of samples in the serial output to obtain an output sequence organized as a pairwise series of samples, and for serially providing an associated butterfly unit with the output sequence, the interleaving memory comprising
a plurality of memory elements, each element having a write storage address for storing a sample in the serial output, wherein the number of memory elements is less than the number of samples in the serial output, and
an interleaver controller for receiving a sample from the serial output, determining the write storage address of one of the plurality of memory elements for storing the sample, writing the sample to the memory element associated with the determined write storage address, determining a read storage address associated with a memory element, and reading out the sample stored in the memory element associated with the determined read storage address to provide a sample of an output sequence, wherein the samples from the serial output are interleaved in accordance with a non-repeating pattern.

15. The FFT processor of claim 14 wherein the interleaving memory receives the serial output from a previous butterfly module.

16. The FFT processor of claim 14 wherein the at least one of the plurality of butterfly module includes a modified butterfly unit.

17. The FFT processor of claim 16, wherein the modified butterfly unit is a multiplierless butterfly unit.

18. The FFT processor or claim 16 wherein the modified butterfly unit includes a set of adders for receiving real and imaginary components of each sample in the output sequence from the interleaving memory, and for performing the butterfly operation using the received real and imaginary components of each sample.

19. The FFT processor of claim 16 wherein the modified butterfly unit includes:
a multiplexer for receiving the samples in the output sequence from the interleaving memory, for swapping real and imaginary components of selected samples and for providing the selectively swapped components as an output; and
a set of adders, for performing the butterfly operation using the selectively swapped components from the multiplexer.

20. The FFT processor of claim 19 further including a modulo counter for controlling the multiplexer to perform component swapping on one half of the samples in the output sequence.

21. The FFT processor of claim 14 wherein the interleaver includes:
an addressable memory for receiving and storing the serial output of the first butterfly module; and
an address generator for generating memory addresses at which each result from the first butterfly can be stored.

22. The FFT processor of claim 21 wherein the addressable memory is sized to store one half of the serial output of the first butterfly module.

23. The FFT processor of claim 21 wherein the interleaver further includes a complete compressing permuter for providing the address generator with memory addresses for the first half of the serial output of the first butterfly module.

24. The FFT processor of claim 23 wherein for a the $x^{th}$ sample in the serial output, the complete compressing permuter generates an address in accordance with the formula $$c_m(x) = \begin{cases} x & , 0 \leq x \bmod 2^m < 2^{m-1} \\ 2^m \lfloor \frac{x}{2^m} \rfloor + f(x \bmod 2^{m-1}) & , 2^{m-1} \leq x \bmod 2^m < 2^m \end{cases},$$

where $2_m$ is the size of the addressable memory, and $$f(x) = \frac{x}{2^{\log_2(g(x+1))+1}},$$

where g(x) is the bitwise-and of the sample and its sign inverse.

25. The FFT processor of claim 24 wherein the complete compressing permuter includes: a compressing permuter for determining an address in accordance with $$2^m \lfloor \frac{x}{2^m} \rfloor + f(x \bmod 2^{m-1});$$

and
a multiplexer for switching between the address determined by the compressing permuter and an address determined in accordance with the position of the sample in the serial output.

* * * * *